US010189920B2

(12) United States Patent
Lee et al.

(10) Patent No.: US 10,189,920 B2
(45) Date of Patent: Jan. 29, 2019

(54) HYBRID SUPPORTED CATALYST SYSTEM AND METHOD OF PREPARING POLYOLEFIN USING THE SAME

(71) Applicant: LG CHEM, LTD., Seoul (KR)

(72) Inventors: Seung Mi Lee, Daejeon (KR); Yong Ho Lee, Daejeon (KR); Jin Young Park, Daejeon (KR); Ki Soo Lee, Daejeon (KR); Eun Ji Shin, Daejeon (KR); Seok Pil Sa, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/552,136

(22) PCT Filed: Jan. 27, 2016

(86) PCT No.: PCT/KR2016/000880
§ 371 (c)(1),
(2) Date: Aug. 18, 2017

(87) PCT Pub. No.: WO2016/186295
PCT Pub. Date: Nov. 24, 2016

(65) Prior Publication Data
US 2018/0072827 A1 Mar. 15, 2018

(30) Foreign Application Priority Data

May 15, 2015 (KR) .................. 10-2015-0068299
Jan. 26, 2016 (KR) .................. 10-2016-0009561

(51) Int. Cl.
C08F 110/02 (2006.01)
C08F 4/02 (2006.01)
C08F 4/69 (2006.01)
C08F 10/00 (2006.01)
C08F 210/16 (2006.01)
C08F 4/659 (2006.01)
C08F 4/6592 (2006.01)
C08F 210/00 (2006.01)
C07C 2/30 (2006.01)

(52) U.S. Cl.
CPC .............. C08F 110/02 (2013.01); C08F 4/02 (2013.01); C08F 4/69 (2013.01); C08F 10/00 (2013.01); C08F 210/00 (2013.01); C08F 210/16 (2013.01); C08F 4/6592 (2013.01); C08F 4/65912 (2013.01); C08F 4/65916 (2013.01); C08F 4/69086 (2013.01)

(58) Field of Classification Search
CPC .............. C08F 4/61904; C08F 4/63904; C08F 2410/03; C07C 2/30; C07C 2531/18
USPC ........................................................ 526/114
See application file for complete search history.

(56) References Cited

U.S. PATENT DOCUMENTS

| 4,806,513 A | 2/1989 | McDaniel et al. |
|---|---|---|
| 5,037,911 A | 8/1991 | McDaniel et al. |
| 5,401,820 A | 3/1995 | McDaniel et al. |
| 6,794,326 B1 | 9/2004 | Follestad et al. |
| 8,124,577 B2 | 2/2012 | Bernhardt et al. |
| 2006/0229480 A1 | 10/2006 | Blann et al. |
| 2008/0027188 A1 | 1/2008 | Small et al. |
| 2008/0207857 A1 | 8/2008 | Small et al. |
| 2012/0123078 A1 | 5/2012 | Lee et al. |
| 2012/0172645 A1 | 7/2012 | Sydora |
| 2012/0316303 A1 | 12/2012 | Hanton et al. |
| 2015/0152200 A1 | 6/2015 | Hanton et al. |
| 2015/0298110 A1 | 10/2015 | Cho et al. |
| 2015/0361118 A1 | 12/2015 | Lee et al. |
| 2016/0045906 A1 | 2/2016 | Sa et al. |
| 2016/0122371 A1 | 5/2016 | Lee et al. |
| 2016/0152742 A1 | 6/2016 | Lee et al. |
| 2016/0159828 A1 | 6/2016 | Lee et al. |
| 2016/0168281 A1 | 6/2016 | Lee et al. |
| 2016/0237187 A1 | 8/2016 | Hong et al. |
| 2016/0237188 A1 | 8/2016 | Hong et al. |
| 2016/0304637 A1 | 10/2016 | Lee et al. |

FOREIGN PATENT DOCUMENTS

| CN | 103285926 A | 9/2013 |
|---|---|---|
| CN | 103626899 A | 3/2014 |
| EP | 2328905 B1 | 1/2014 |
| JP | 08-005934 A | 1/1996 |
| JP | 11-228621 A | 8/1999 |
| JP | 2002-511500 A | 4/2002 |
| JP | 2006-516265 A | 6/2006 |
| JP | 2012-526175 A | 10/2012 |
| KR | 10-2007-0114696 A | 12/2007 |
| KR | 10-2008-0080570 A | 9/2008 |

(Continued)

OTHER PUBLICATIONS

Blann et al. "Ethylene tetramerisation: Subtle effects exhibited by N-substituted diphosphinoamine ligands"Journal of Catalysis, 2007, 249, 2, 244-249.

(Continued)

Primary Examiner — Fred M Teskin
(74) Attorney, Agent, or Firm — Dentons US LLP

(57) ABSTRACT

Provided are a hybrid supported catalyst system and a method of preparing a polyolefin using the same. The hybrid supported catalyst system according to the present invention may be used to perform oligomerization and copolymerization of olefin monomers in a single reactor at the same time with high efficiency without a separate process of preparing alpha-olefin. Therefore, costs for preparing or purchasing comonomers which are expensive raw materials may be reduced, thereby reducing the production cost of a final product.

14 Claims, No Drawings

(56) References Cited

FOREIGN PATENT DOCUMENTS

| KR | 10-2012-0048468 A | 5/2012 |
|---|---|---|
| KR | 10-2012-0098711 A | 9/2012 |
| KR | 10-2013-0142151 A | 12/2013 |
| KR | 10-2014-0126613 A | 10/2014 |
| KR | 10-2015-0006474 A | 1/2015 |
| KR | 10-1423247 B1 | 1/2015 |
| KR | 10-1483248 A | 1/2015 |
| KR | 10-2015-0037581 A | 4/2015 |
| KR | 10-2015-0058049 A | 5/2015 |
| WO | 2004-076502 A | 9/2014 |
| WO | 2015/046965 A1 | 4/2015 |
| WO | 2015/072811 A1 | 5/2015 |

OTHER PUBLICATIONS

Naik et al. "N1,N1,N4,N4-Tetrakis(dibenzylphosphino)benzene-1,4-diamine:Synthesis, structural studies and transition metal chemistry", Inorganica Chimica Acta 407 (2013) 139-144.

Akba et al. "Synthesis and characterizations of N,N,N0,N0-tetrakis (diphenylphosphino)ethylendiamine derivatives: Use of palladium(II) complex as pre-catalyst in Suzuki coupling and Heck reactions", Journal of Organometallic Chemistry, 2009 vol. 694, No. 5, pp. 731-736.

Stennett, et al. "Avoiding MAO: Alternative Activation Methods in Selective Ethylene Oligomerization", Organometallics, 2012, vol. 31, No. 19, pp. 6960-6965.

Biricik, et al., "The Synthesis, Characterisation, and Reactivity of Some Polydentate Phosphinoamine Ligands with Benzene-1,3-diyl and Pyridine-2,6-diyl Backbones", Helvetica Chimica Acta, vol. 86, 2003.

Tao, et al. "Ethylene tetramerization with a highly active and long-lifetime trinuclear diphenylphosphinoamine/Cr(III)/MAO catalyst", Chinese Science Bulletin, 2012, vol. 57, No. 13, 1510-1515.

Liu, et al. "Very Large Cooperative Effects in Heterobimetallic Titanium-Chromium Catalysts for Ethylene Polymerization/Copolymerization", Journal of the American Chemical Society, 2014.

Peitz, et al. "Heterobimetallic AlClCr Intermediates with Relevance to the Selective Catalytic Ethene Trimerization Systems Consisting of CrCl3(THF)3, the Aminophosphorus Ligands Ph2PN(R)P(Ph)N(R)H, and Triethylaluminum", Organometallics,2011, 30, pp. 2364-2370.

Tao, et al. "Preparation of 1-octene by ethylene tetramerization with high selectivity", Chinese Science Bulletin 2006 vol. 51 No. 5 521-523.

HYBRID SUPPORTED CATALYST SYSTEM AND METHOD OF PREPARING POLYOLEFIN USING THE SAME

CROSS-REFERENCE TO RELATED APPLICATION

This application is a National Stage Entry of International Application No. PCT/KR2016/000880 filed on Jan. 27, 2016, and claims the benefit of Korean Application No. 10-2015-0068299 filed on May 15, 2015, Korean Application No. 10-2015-0068300 filed on May 15, 2015, and Korean Application No. 10-2016-0009561 filed on Jan. 26, 2016, all of which are hereby incorporated by reference in their entirety for all purposes as if fully set forth herein.

BACKGROUND OF THE INVENTION

(a) Field of the Invention

The present invention relates to a hybrid supported catalyst system and a method of preparing a polyolefin using the same.

(b) Description of the Related Art

A linear alpha-olefin, which is an important material used for a comonomer, a cleaner, a lubricant, a plasticizer, etc., is commercially widely used, and particularly, 1-hexene and 1-octene are commonly used as a comonomer for controlling the density of polyethylene during preparation of linear low-density polyethylene (LLDPE).

In the existing preparation process of LLDPE (Linear Low-Density Polyethylene), copolymerization of ethylene with alpha-olefin, for example, a comonomer such as 1-hexene and 1-octene is carried out in order to control its density by forming branches in a polymer backbone.

Thus, there is a problem in that the cost of comonomers accounts for a large part of the production cost in the preparation of LLPDE having a high content of comonomers. To solve this problem, many different methods have been tried.

Further, since alpha-olefins have a different application field or market size according to the kind, a technology capable of selectively producing specific olefins is commercially very important, and recently, many studies have been carried out on a chromium catalyst technology for preparing 1-hexene or 1-octene with high selectivity through selective ethylene oligomerization.

The existing commercial preparation methods of 1-hexene or 1-octene include a SHOP process of Shell Chemical, a Ziegler process of Chevron Philips, etc., whereby C4~C20 alpha-olefins of wide distribution may be produced. However, since these methods synthesize alpha-olefins having different lengths at the same time according to a Schulz-Flory distribution, there has been a problem in that it is necessary to perform an additional separation process to obtain a specific alpha-olefin.

To solve this problem, a method of selectively synthesizing 1-hexene through trimerization of ethylene or a method of selectively synthesizing 1-octene through tetramerization of ethylene has been proposed. Further, many studies have been conducted on a catalyst system that enables selective oligomerization of ethylene.

However, although the catalyst system that enables selective oligomerization of ethylene is used, alpha-olefins produced by the oligomerization should be separated and then fed into a copolymerization process as a comonomer, together with ethylene. Thus, there are problems that the process is cumbersome and the production cost is increased.

SUMMARY OF THE INVENTION

Accordingly, an object of the present invention is to provide a catalyst system capable of performing oligomerization and copolymerization of olefin monomers in a single reactor at the same time with high efficiency without a separate process of preparing alpha-olefin, and a method of preparing a polyolefin using the same.

According to an aspect of the present invention, provided is a hybrid supported catalyst system including one or more organic chromium compounds and one or more metallocene compounds supported on a support, wherein the organic chromium compound includes two or more of a group represented by the following Chemical Formula 1 in a molecule, phosphorous atoms (P) in one or more of the group represented by Chemical Formula 1 form a coordinate bond with chromium (Cr), and a linkage group (L) linking the two or more groups represented by the following Chemical Formula 1 via 4 to 8 carbon atoms is an aliphatic group having 2 to 20 carbon atoms, a heteroaliphatic group having 2 to 20 carbon atoms, an alicyclic group having 2 to 20 carbon atoms, a heteroalicyclic group having 2 to 20 carbon atoms, or a group prepared by linking two or more of the aliphatic group, the heteroaliphatic group, the alicyclic group, and the heteroalicyclic group:

[Chemical Formula 1]

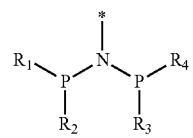

wherein * is a part which binds to the linkage group (L) linking the two or more groups, and $R_1$ to $R_4$ are each independently an alkyl group having 1 to 20 carbon atoms, an alkenyl group having 2 to 20 carbon atoms, an aryl group having 6 to 20 carbon atoms, an arylalkyl group having 7 to 20 carbon atoms, an alkylaryl group having 7 to 20 carbon atoms, or an alkoxyaryl group having 7 to 20 carbon atoms.

Further, according to another aspect of the present invention, provided is a method of preparing a polyolefin including the step of polymerizing olefinic monomers in the presence of the hybrid supported catalyst system.

When the hybrid supported catalyst system according to the present invention is used, oligomerization and copolymerization of olefin monomers may be performed in a single reactor at the same time with high efficiency without a separate process of preparing alpha-olefin. Therefore, costs for preparing or purchasing comonomers which are expensive raw materials may be reduced, thereby reducing the production cost of a final product.

With regard to the hybrid supported catalyst system of the present invention, alpha-olefin comonomers primarily produced may exist inside the supported catalyst system or in the vicinity of the supported catalyst system, and therefore, its accessibility to the metallocene compound which is a co(polymerization) catalyst is increased to improve a comonomer conversion rate, thereby improving copolymerization efficiency.

Further, since the amount of comonomers not incorporated into the polyolefin during the polymerization process is small, a fouling phenomena caused thereby may be reduced to enhance process stability, and contents of SCB (short chain branch) and LCB (long chain branch) in the polyolefin may be increased without separate feeding of comonomers, thereby producing high-quality linear low-density polyethylene.

DETAILED DESCRIPTION OF THE EMBODIMENTS

The present invention will be described in more detail in the following Examples. However, the following Examples are illustrative purposes only, and the scope of the present invention is not limited thereto.

The terminology used herein is for the purpose of describing particular embodiments only and is not intended to be limiting of the invention, unless there is a particular mention about them. The singular forms used herein are intended to include the plural forms as well, unless the context clearly indicates otherwise. It will be further understood that the term 'include', when used in this specification, specify the presence of stated features, areas, integers, steps, operations, elements, and/or components, but do not preclude the presence or addition of other features, areas, integers, steps, operations, elements, components, and/or groups.

Hereinafter, a hybrid supported catalyst system and a method of preparing a polyolefin using the same according to specific embodiments of the present invention will be described in more detail.

According to an embodiment of the present invention, provided is a hybrid supported catalyst system including one or more organic chromium compounds and one or more metallocene compounds supported on a support, wherein the organic chromium compound includes two or more of a group represented by the following Chemical Formula 1 in a molecule, phosphorous atoms (P) in one or more of the group represented by Chemical Formula 1 form a coordinate bond with chromium (Cr), and a linkage group (L) linking the two or more groups via 4 to 8 carbon atoms is an aliphatic group having 2 to 20 carbon atoms, a heteroaliphatic group having 2 to 20 carbon atoms, an alicyclic group having 2 to 20 carbon atoms, a heteroalicyclic group having 2 to 20 carbon atoms, or a group prepared by linking two or more of the aliphatic group, the heteroaliphatic group, the alicyclic group, and the heteroalicyclic group:

[Chemical Formula 1]

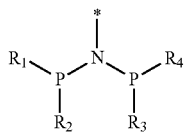

wherein * is a part which binds to the linkage group (L) linking the two or more groups, and $R_1$ to $R_4$ are each independently an alkyl group having 1 to 20 carbon atoms, an alkenyl group having 2 to 20 carbon atoms, an aryl group having 6 to 20 carbon atoms, an arylalkyl group having 7 to 20 carbon atoms, an alkylaryl group having 7 to 20 carbon atoms, or an alkoxyaryl group having 7 to 20 carbon atoms.

As used herein, the term 'hybrid supported catalyst system' means a catalyst system in such a state that it may be obtained as an active catalyst composition by adding an organic chromium compound, a metallocene compound, and a support; or alternatively, the organic chromium compound, the metallocene compound, a cocatalyst, and the support at the same time or in any order. The hybrid supported catalyst system may be added to a reaction system in the presence or absence of any solvent and monomers.

As used herein, the term 'oligomerization' means polymerization of a small number of olefinic monomers. According to the number of olefinic monomers to be oligomerized, the oligomerization is called trimerization or tetramerization, which is generally referred to as multimerization or oligomerization. Particularly, in the present invention, oligomerization means, but is not limited to, selective preparation of 1-hexene and/or 1-octene, which are main comonomers of LLDPE, from ethylene.

Selective olefin oligomerization is closely related to a catalyst system to be used. A catalyst used for olefin oligomerization includes a ligand and a transition metal coordinately binding to the ligand, in which the structure of the active catalyst may be changed according to a chemical structure of the ligand, thereby varying selectivity for alpha-olefin and activity.

According to an embodiment of the present invention, the organic chromium compound includes a previously unknown ligand compound, and it was confirmed that if a substituent introduced in the ligand compound is appropriately controlled, the electronic, steric environment around a transition metal (Cr) may be easily controlled, thereby enabling olefin oligomerization with high catalytic activity and selectivity.

The organic chromium compound according to an embodiment of the present invention includes two or more of a diphosphinoamine functional group (hereinafter, referred to as a PNP functional group) represented by the following Chemical Formula 1 in the molecule, and phosphorous atoms (P) of one or more of the PNP functional group form a coordinate bond with chromium (Cr) to form a chromium complex compound. That is, the organic chromium compound according to an embodiment of the present invention is a compound, in which chromium forms a coordinate bond with any one or more of the PNP functional group in the ligand compound including two or more of the PNP functional group in the molecule.

In the hybrid supported catalyst system of the present invention, this organic chromium compound may function to induce oligomerization of olefinic monomers with excellent catalytic activity.

[Chemical Formula 1]

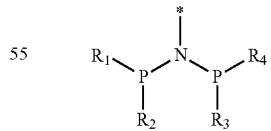

wherein * is a part which binds to the linkage group (L) linking the two or more groups, and $R_1$ to $R_4$ are each independently an alkyl group having 1 to 20 carbon atoms, an alkenyl group having 2 to 20 carbon atoms, an aryl group having 6 to 20 carbon atoms, an arylalkyl group having 7 to 20 carbon atoms, an alkylaryl group having 7 to 20 carbon atoms, or an alkoxyaryl group having 7 to 20 carbon atoms.

More specifically, specific examples of the ligand compound including one or more of the PNP functional group represented by the following Chemical Formula 1 may include the following compounds, but the present invention is not limited thereto:

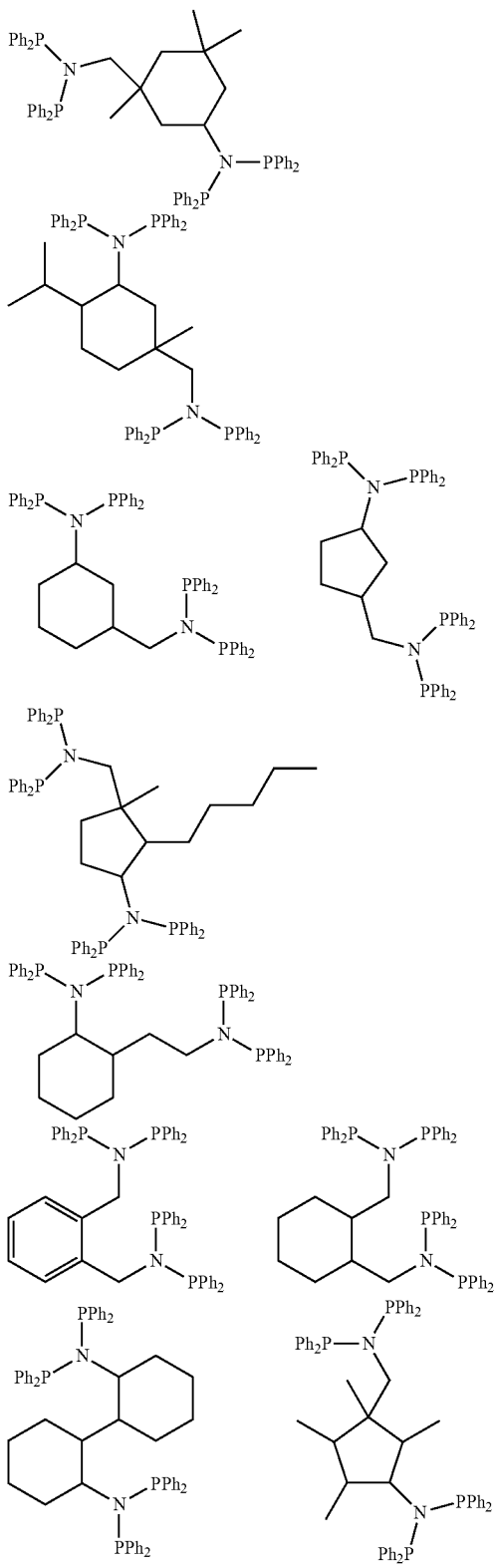

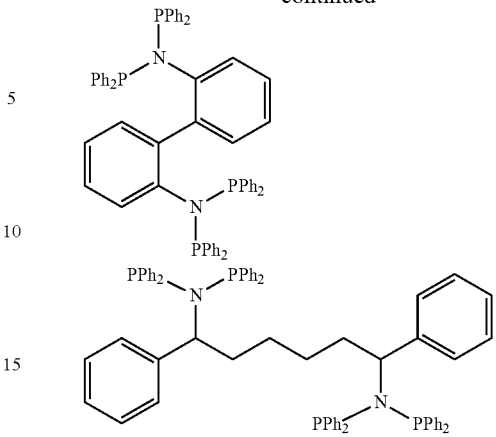

The ligand compound may be synthesized by a method such as the following Reaction Scheme 1, but the present invention is not limited thereto. A method of preparing the ligand compound will be explained in more detail in Examples described below:

[Reaction Scheme 1]

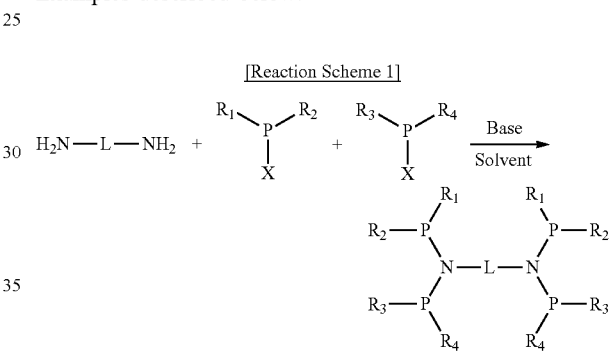

wherein definitions of $R_1$ to $R_4$ and L are the same as in the definition of Chemical Formula 1, and X is halogen.

Further, specific examples of the ligand compound may include all possible optical isomers.

The organic chromium compound of the present invention may be a chromium complex compound obtained by reacting the ligand compound and a chromium source.

Specific examples of the chromium source which forms the chromium complex compound together with the ligand compound may be any one or more selected from the group consisting of chromium(III)acetylacetonate, tris (tetrahydrofuran)chromium trichloride, chromium(III)-2-ethylhexanoate, chromium(III)tris(2,2,6,6-tetramethyl-3,5-heptanedionate), chromium(III)benzoylacetonate, chromium(III) hexafluoro-2,4-pentanedionate, and chromium(III)acetate hydroxide.

The PNP functional groups of Chemical Formula 1 may be linked via 4 to 8 carbon atoms, and the linkage group (L) linking the PNP functional groups may have an aliphatic group having 2 to 20 carbon atoms, a heteroaliphatic group having 2 to 20 carbon atoms, an alicyclic group having 2 to 20 carbon atoms, a heteroalicyclic group having 2 to 20 carbon atoms, or a group prepared by linking two or more of the aliphatic group, the heteroaliphatic group, the alicyclic group, and the heteroalicyclic group. Due to this structural feature, the organic chromium compound which is a complex by coordinate binding of the ligand compound to a transition metal (Cr) may exhibit high oligomerization activity, and particularly, high selectivity for 1-hexene, 1-octene, etc., because PNP—Cr may easily interact according to the electronic/steric environment around the transition metal (Cr).

Therefore, the organic chromium compound may be applied to the hybrid supported catalyst system to exhibit high oligomerization activity, and particularly, high selectivity for 1-hexene, 1-octene, etc. Accordingly, 1-hexene, 1-octene, etc. produced thereby is incorporated as a comonomer during the polyolefin polymerization to prepare a high-quality polyolefin.

In the definition of the Chemical Formula, the aryl group is preferably an aromatic ring having 6 to 20 carbon atoms, and specific examples thereof may include phenyl, naphthyl, anthracenyl, pyridyl, dimethylanilinyl, anisolyl, etc., but is not limited thereto.

The alkylaryl group means an aryl group having 6 to 20 carbon atoms, which is substituted with one or more linear or branched alkyl groups, the arylalkyl group means a linear or branched alkyl group, which is substituted with one or more aryl groups having 6 to 20 carbon atoms, and the alkoxyaryl group means an aryl group having 6 to 20 carbon atoms, which is substituted with one or more alkoxy groups.

Further, the heteroatom means N, O, F, S, or P, and the heteroaryl group means an aryl group containing one or more heteroatoms.

Further, the halogen means fluorine (F), chlorine (Cl), bromine (Br), or iodine (I).

Meanwhile, the organic chromium compound of an embodiment of the present invention may include two or more, preferably two of the group represented by Chemical Formula 1, and a linkage group (L) linking these groups via 4 to 8 carbon atoms may be an aliphatic group having 2 to 20 carbon atoms, a heteroaliphatic group having 2 to 20 carbon atoms, an alicyclic group having 2 to 20 carbon atoms, a heteroalicyclic group having 2 to 20 carbon atoms, or a group prepared by linking two or more of the aliphatic group, the heteroaliphatic group, the alicyclic group, and the heteroalicyclic group.

Specific examples of the linkage group (L) are as follows:

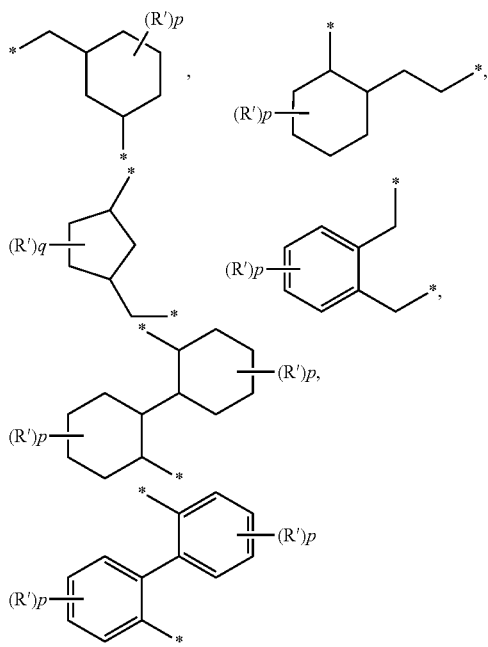

wherein * is a part which binds to N of Chemical Formula 1, R's are each independently hydrogen or alkyl having 1 to 5 carbon atoms, p is an integer of 1 to 6, q is an integer of 1 to 5, and a plurality of R's binding to one ring (cyclohexane or phenyl) are the same as or different from each other.

As such, when two or more of the group represented by Chemical Formula 1 are linked via 4 to 8 carbon atoms, the linkage group L linking the two or more of the group via 4 to 8 carbon atoms preferably includes a flexible aliphatic group in order to facilitate interactions between organic chromium complexes which are obtained by linking the two or more of the group of Chemical Formula 1.

That is, even though two or more of the group represented by Chemical Formula 1 are linked via 4 to 8 carbon atoms, if the linkage group includes only an alicyclic group or an aromatic group without the aliphatic group, for example, as the case where Chemical Formula 1 is substituted at 1- and 4-positions of cyclohexane, interactions may be extremely restricted to significantly reduce activity per unit PNP—Cr and to lower selectivity for alpha-olefins having a low carbon number such as 1-hexene and 1-octene.

The organic chromium compound including the group represented by Chemical Formula 1 may be a catalyst precursor capable of progressing olefin oligomerization by coordinate binding of the PNP functional group to chromium. As described above, the organic chromium compound of an embodiment forms a chromium complex while one or more of the PNP functional groups are appropriately spaced, and therefore, increase of catalytic activity and improvement of selectivity due to the interaction between the two groups are confirmed in Examples described below.

According to an Example of the present invention, $R_1$ to $R_4$ of Chemical Formula 1 may be the same as each other, and preferably, phenyl.

Meanwhile, according to an Example of the present invention, when the organic chromium compound includes two of the group represented by Chemical Formula 1, in which each of the two groups of Chemical Formula 1 forms a coordinate bond with chromium, it may be represented by the following Chemical Formula 1-1:

[Chemical Formula 1-1]

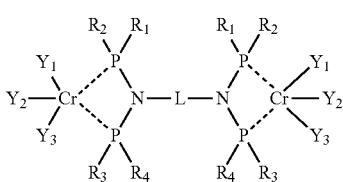

wherein L, $R_1$ to $R_4$ are the same as in the definition of Chemical Formula 1, $Y_1$ to $Y_3$ are each independently halogen, hydrogen, a hydrocarbyl group having 1 to 10 carbon atoms, or a heterohydrocarbyl group having 1 to 10 carbon atoms.

That is, L is a linkage group linking nitrogen (N) atoms via 4 to 8 carbon atoms, and is an aliphatic group having 2 to 20 carbon atoms, a heteroaliphatic group having 2 to 20 carbon atoms, an alicyclic group having 2 to 20 carbon atoms, a heteroalicyclic group having 2 to 20 carbon atoms, or a group prepared by linking two or more of the aliphatic group, the heteroaliphatic group, the alicyclic group, and the heteroalicyclic group, $R_1$ to $R_4$ are each independently an alkyl group having 1 to 20 carbon atoms, an alkenyl group having 2 to 20 carbon atoms, an aryl group having 6 to 20 carbon atoms, an arylalkyl group having 7 to 20 carbon atoms, an alkylaryl group having 7 to 20 carbon atoms, or an alkoxyaryl group having 7 to 20 carbon atoms;

$Y_1$ to $Y_3$ are each independently halogen, hydrogen, a hydrocarbyl group having 1 to 10 carbon atoms, or a heterohydrocarbyl group having 1 to 10 carbon atoms.

According to an Example of the present invention, $R_1$ to $R_4$ of Chemical Formula 1-1 may be the same as each other, and preferably phenyl.

Further, $Y_1$, $Y_2$ and $Y_3$ of Chemical Formula 1-1 may be each independently halogen, hydrogen, a hydrocarbyl group, or a heterohydrocarbyl group. For non-limiting example, $Y_1$, $Y_2$ and $Y_3$ may be each independently an acetylacetonate group, an acetate group, a tetrahydrofuran group, a 2-ethyl hexanonate group, a butyrate group, a pentanoate group, a laurate group, a stearate group, etc.

Further, the specific organic chromium compound may include all possible optical isomers.

Meanwhile, according to another Example of the present invention, when the organic chromium compound includes two or more of the group represented by Chemical Formula 1, in which only any one of the two groups of Chemical Formula 1 forms a coordinate bond with chromium, it may be represented by the following Chemical Formula 1-2:

[Chemical Formula 1-2]

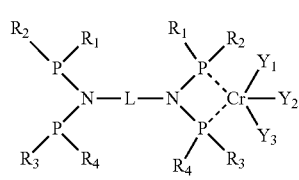

wherein L, $R_1$ to $R_4$, $Y_1$, to $Y_3$ are the same as in the definition of Chemical Formula 1-1.

That is, in the organic chromium compound of the present invention, one of the ligand groups of Chemical Formula 1 forms a coordinate bond with chromium, and the other thereof may exit as a free ligand without forming a coordinate bond with chromium.

The PNP functional group forming a coordinate bond with chromium exhibits oligomerization activity for olefinic monomers, but phosphorous atoms (P) of the free ligand which does not form a coordinate bond with chromium may form a Lewis acid-base bond with the support or the cocatalyst in the hybrid supported catalyst system. Therefore, the supporting ability of the PNP—Cr catalyst onto the support may be enhanced to increase the supporting efficiency, thereby further increasing activity of the hybrid supported catalyst system and efficiency of the oligomerization process.

The organic chromium compound including a free ligand as in Chemical Formula 1-2 may be obtained by reacting a smaller number of moles of the chromium source than that of the PNP functional group present in the ligand compound of Chemical Formula 1. For example, the chromium source of less than 1 mole, for example, about 0.2 mole to about 0.8 mole, preferably, about 0.4 mole to about 0.6 mole is reacted with respect to 1 mole of the PNP functional group present in the ligand compound represented by Chemical Formula 1, thereby preparing the organic chromium compound having the free ligand in part. In order to improve the catalytic activity and the supporting efficiency at the same time, the chromium source may be preferably included within the above range.

Meanwhile, the hybrid supported catalyst system of the present invention includes one or more metallocene compounds.

An alpha-olefin comonomer such as 1-hexene or 1-octene which is produced by oligomerization of olefinic monomers by the organic chromium compound is copolymerized with other olefinic monomer to form a polyolefin by a catalytic action of the metallocene compound supported on the hybrid supported catalyst system of the present invention. In this regard, the alpha-olefin comonomer which is primarily produced by the organic chromium compound may exist inside the hybrid supported catalyst system or in the vicinity of the hybrid supported catalyst system, and therefore, its accessibility to the metallocene compound which is a polyolefin co(polymerization) catalyst is increased, thereby exhibiting a high comonomer conversion rate. Further, due to the high accessibility to the metallocene compound, the number of the comonomers not incorporated into the polyolefin during the copolymerization process is small, and a fouling phenomenon caused thereby may be reduced to increase process stability, and contents of SCB (short chain branch) and LCB (long chain branch) in the polyolefin may be increased without separate feeding of comonomers which are expensive raw materials, thereby producing high-quality linear low-density polyethylene.

According to an Example of the present invention, the metallocene compound may be one or more selected from compounds represented by the following Chemical Formulae 3 to 6:

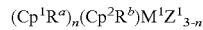  [Chemical Formula 3]

$(Cp^1R^a)_n(Cp^2R^b)M^1Z^1_{3-n}$ wherein $M^1$ is a Group 4 transition metal;

$Cp^1$ and $Cp^1$ are the same as or different from each other, and each independently any one selected from the group consisting of cyclopentadienyl, indenyl, 4,5,6,7-tetrahydro-1-indenyl, and fluorenyl radicals, which may be substituted with hydrocarbon having 1 to 20 carbon atoms;

$R^a$ and $R^b$ are the same as or different from each other, and each independently hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^1$ is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, a substituted or unsubstituted amino group, C2 to C20 alkylalkoxy, or C7 to C40 arylalkoxy;

n is 1 or 0;

$(Cp^3R^c)_mB^1(Cp^4R^d)M^2Z^2_{3-m}$ [Chemical Formula 4]

wherein $M^2$ is a Group 4 transition metal;

$Cp^3$ and $Cp^4$ are the same as or different from each other, and each independently any one selected from the group consisting of cyclopentadienyl, indenyl, 4,5,6,7-tetrahydro-1-indenyl, and fluorenyl radicals, which may be substituted with hydrocarbon having 1 to 20 carbon atoms;

$R^c$ and $R^d$ are the same as or different from each other, and each independently hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^2$ is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, a substituted or unsubstituted amino group, C2 to C20 alkylalkoxy, or C7 to C40 arylalkoxy;

$B^1$ is one or more of carbon, germanium, silicon, phosphorus, or nitrogen-containing radical, or a combination thereof, which crosslinks a $Cp^3R^c$ ring with a $Cp^4R^d$ ring, or crosslinks one $Cp^4R^d$ ring to $M^2$;

m is 1 or 0;

$(Cp^5R^e)B^2(J)M^3Z^3{}_2$ [Chemical Formula 5]

wherein $M^3$ is a Group 4 transition metal;

$Cp^5$ is any one selected from the group consisting of cyclopentadienyl, indenyl, 4,5,6,7-tetrahydro-1-indenyl, and fluorenyl radicals, which may be substituted with hydrocarbon having 1 to 20 carbon atoms;

$R^e$ is hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^3$ is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, a substituted or unsubstituted amino group, C2 to C20 alkylalkoxy, or C7 to C40 arylalkoxy;

$B^2$ is one or more of carbon, germanium, silicon, phosphorus, or nitrogen-containing radical, or a combination thereof, which crosslinks a $Cp^5R^e$ ring with J; and J is any one selected from the group consisting of $NR^f$, O, $PR^f$ and S, wherein $R^f$ is C1 to C20 alkyl, aryl, substituted alkyl, or substituted aryl;

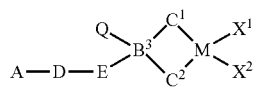

[Chemical Formula 6]

wherein A is hydrogen, halogen, a C1 to C20 alkyl group, a C2 to C20 alkenyl group, a C6 to C20 aryl group, a C7 to C20 alkylaryl group, a C7 to C20 arylalkyl group, a C1 to C20 alkoxy group, a C2 to C20 alkoxyalkyl group, a C3 to C20 heterocycloalkyl group, or a C5 to C20 heteroaryl group;

D is —O—, —S—, —N(R)— or —Si(R)(R')—, wherein R and R' are the same as or different from each other, and each independently hydrogen, halogen, a C1 to C20 alkyl group, a C2 to C20 alkenyl group, or a C6 to C20 aryl group;

E is a C1 to C10 linear or branched alkylene group;

$B^3$ is carbon, silicon, or germanium;

Q is hydrogen, halogen, a C1 to C20 alkyl group, a C2 to C20 alkenyl group, a C6 to C20 aryl group, a C7 to C20 alkylaryl group, or a C7 to C20 arylalkyl group;

M is a Group 4 transition metal;

$X^1$ and $X^2$ are the same as or different from each other, and each independently halogen, a C1 to C20 alkyl group, a C2 to C20 alkenyl group, a C6 to C20 aryl group, a nitro group, an amido group, a C1 to C20 alkylsilyl group, a C1 to C20 alkoxy group, or a C1 to C20 sulfonate group;

$C^1$ and $C^2$ are the same as or different from each other, and each independently represented by any one of the following Chemical Formula 7a, Chemical Formula 7b, or Chemical Formula 7c, provided that both $C^1$ and $C^2$ are not Chemical Formula 7c;

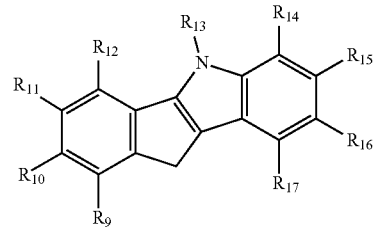

[Chemical Formula 7a]

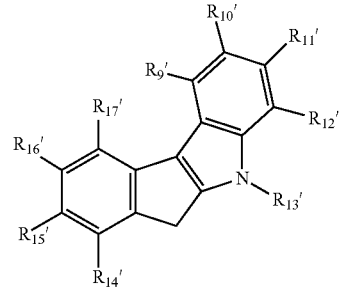

[Chemical Formula 7b]

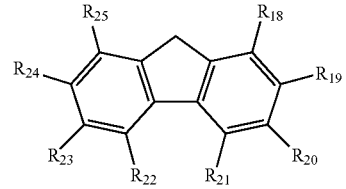

[Chemical Formula 7c]

wherein R9 to R25 and R9' to R17' are the same as or different from each other, and each independently hydrogen, halogen, a C1 to C20 alkyl group, a C2 to C20 alkenyl group, a C1 to C20 alkylsilyl group, a C1 to C20 silylalkyl group, a C1 to C20 alkoxysilyl group, a C1 to C20 alkoxy group, a C6 to C20 aryl group, a C7 to C20 alkylaryl group, or a C7 to C20 arylakyl group, and two or more neighboring groups of R18 to R25 may be connected to each other to form a substituted or unsubstituted aliphatic or aromatic ring.

Meanwhile, each substituent in the metallocene compound of Chemical Formula 6 will be explained in more detail as follows.

The C1 to C20 alkyl group may include a linear or branched alkyl group, and specifically, a methyl group, an ethyl group, a propyl group, an isopropyl group, an n-butyl group, a tert-butyl group, a pentyl group, a hexyl group, a heptyl group, an octyl group, etc., but is not limited thereto.

The C2 to C20 alkenyl group may include a linear or branched alkenyl group, and specifically, an allyl group, an ethenyl group, a propenyl group, a butenyl group, a pentenyl group, etc., but is not limited thereto.

The C6 to C20 aryl group may include a monocyclic or condensed cyclic aryl group, and specifically, a phenyl group, a biphenyl group, a naphthyl group, a phenantrenyl group, a fluorenyl group, etc., but is not limited thereto.

The C5 to C20 heteroaryl group may include a monocyclic or condensed cyclic heteroaryl group, and specifically, a carbozolyl group, a pyridyl group, a quinoline group, an isoquinoline group, a thiophenyl group, a furanyl group, an imidazole group, an oxazolyl group, a thiazolyl group, a triazine group, a tetrahydropyranyl group, a tetrahydrofuranyl group, etc., but is not limited thereto.

The C1 to C20 alkoxy group may include a methoxy group, an ethoxy group, a phenyloxy group, a cyclohexyloxy group, etc., but is not limited thereto.

The Group 4 transition metal may include titanium, zirconium, hafnium, etc., but is not limited thereto.

In Chemical Formulae 7a, 7b and 7c which are ligand-derived structures included in Chemical Formula 6, R9 to R25 and R9' to R17' are more preferably each independently hydrogen, a methyl group, an ethyl group, a propyl group, an isopropyl group, an n-butyl group, a tert-butyl group, a pentyl group, a hexyl group, a heptyl group, an octyl group, a phenyl group, a halogen group, a trimethylsilyl group, a triethylsilyl group, a tripropylsilyl group, a tributylsilyl group, a triisopropylsilyl group, a trimethylsilylmethyl group, a methoxy group, or an ethoxy group, but are not limited thereto.

E of the Chemical Formula 6 is more preferably a C4 to C8 linear or branched alkylene group, but is not limited thereto. Further, the alkylene group may be unsubstituted or substituted with a C1 to C20 alkyl group, a C2 to C20 alkenyl group, or a C6 to C20 aryl group.

Further, A of the Chemical Formula 6 is more preferably hydrogen, a methyl group, an ethyl group, a propyl group, an isopropyl group, an n-butyl group, a tert-butyl group, a methoxymethyl group, a tert-butoxymethyl group, a 1-ethoxyethyl group, a 1-methyl-1-methoxyethyl group, a tetrahydropyranyl group, or a tetrahydrofuranyl group, but is not limited thereto.

Further, $B^3$ of the Chemical Formula 6 is preferably silicon, but is not limited thereto.

Of the metallocene compounds, the metallocene compound represented by Chemical Formula 6 mainly contributes to making a high molecular weight copolymer having a high SCB (short chain branch) content, and the metallocene compound represented by Chemical Formula 3 mainly contributes to making a low molecular weight copolymer having a low SCB content. Further, the metallocene compound represented by Chemical Formula 4 or 5 may contribute to making a low molecular weight copolymer having a medium SCB content.

Particularly, the metallocene compound represented by Chemical Formula 6 forms a ligand structure wherein an indeno indole derivative and a fluorene derivative are cross-linked by a bridge compound, and has an unshared electron pair capable of acting as a Lewis base in the ligand structure, and therefore, is supported on the surface of a support having a Lewis acid property, thereby exhibiting high polymerization activity even when supported. Further, as the metallocene compound includes electron-rich indeno indole group and/or fluorenyl group, it has high activity, and due to appropriate steric hindrance and the electronic effect of the ligand, it has low hydrogen reactivity, and maintains high activity even when hydrogen exists. Thus, if a hybrid supported metallocene catalyst is prepared using the transition metal compound, the nitrogen atom of the indeno indole derivative stabilizes beta-hydrogen of growing polymer chain by hydrogen bond, thereby polymerizing an ultra high molecular weight olefin polymer.

Further, according to an Example of the present invention, two or more different kinds of metallocene compounds selected from Chemical Formulae 3 to 6 are included, thereby preparing a polyolefin which has a wide molecular weight distribution to have excellent physical properties and processability while being a high molecular weight olefin copolymer.

The metallocene compound represented by Chemical Formula 3 may be, for example, a compound represented by any one of the following structural formulae, but is not limited thereto:

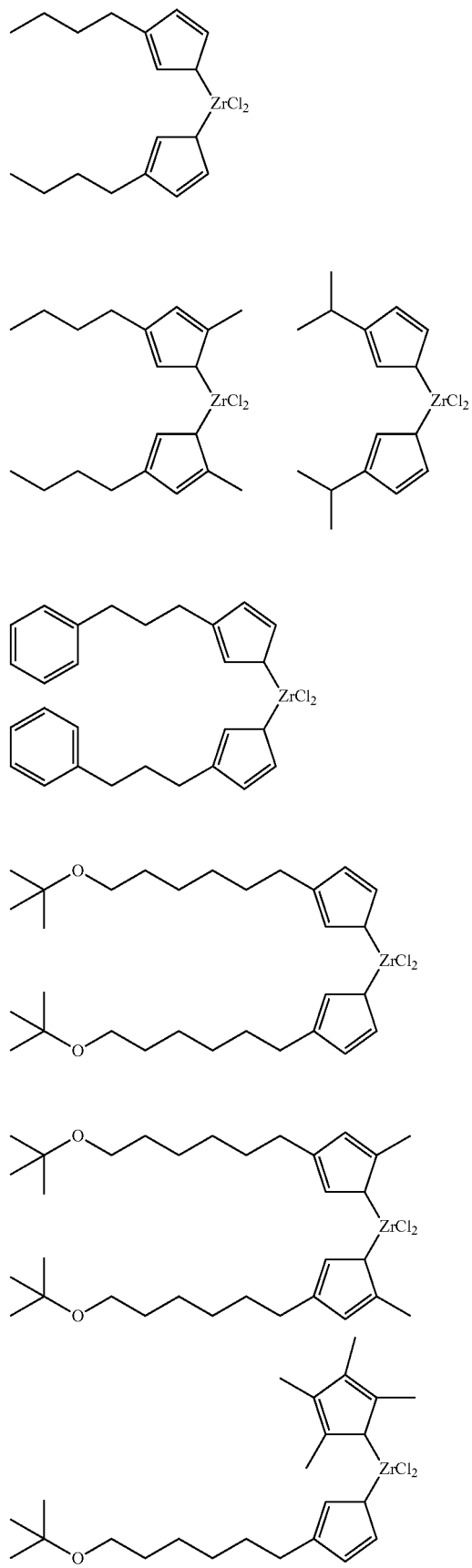

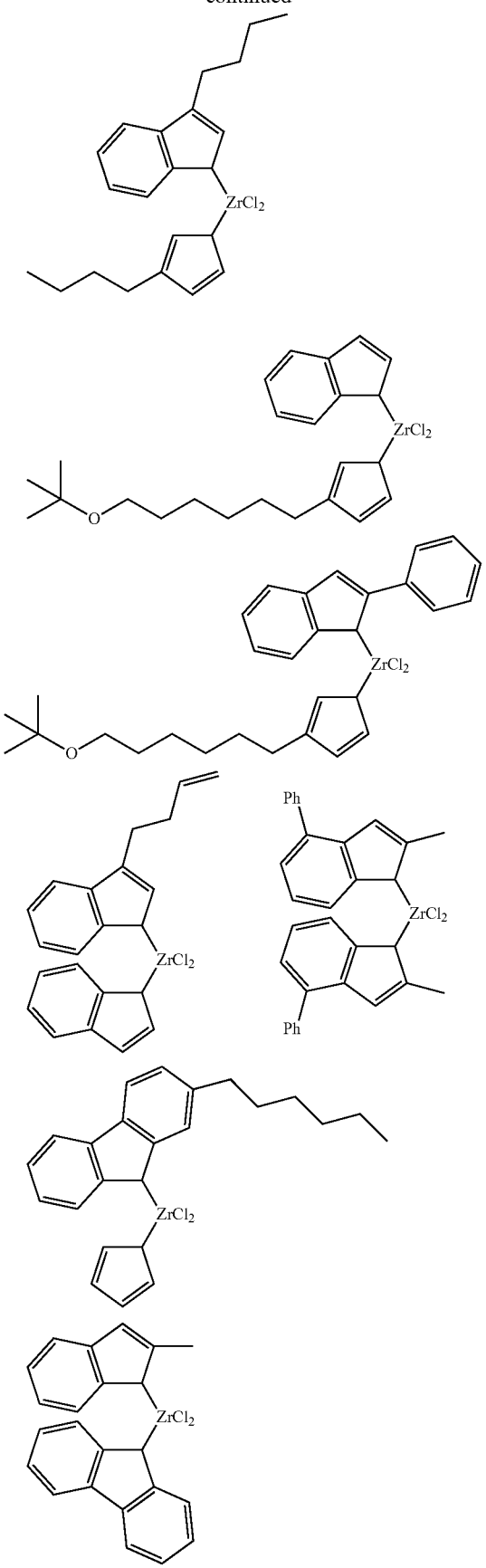
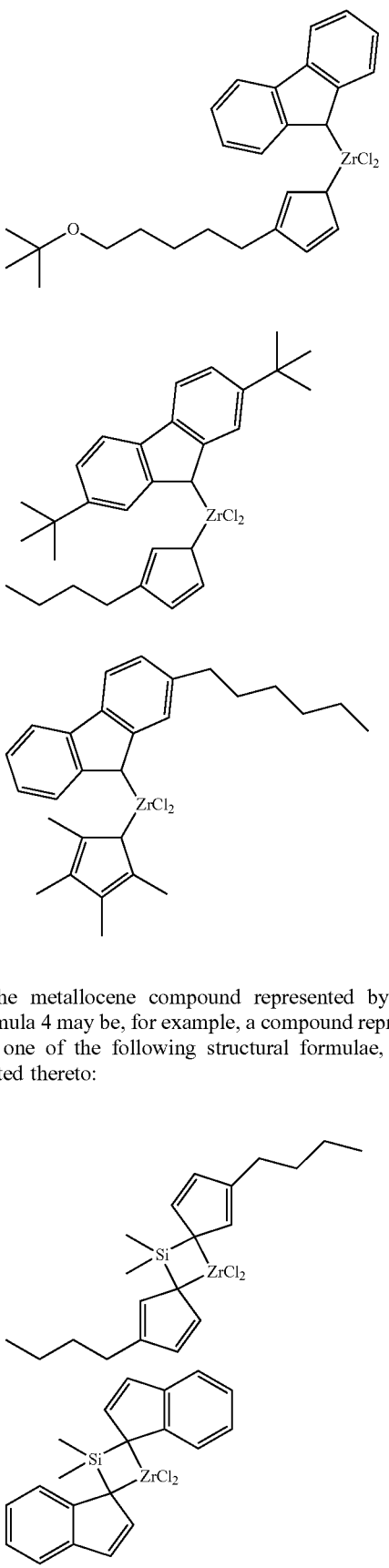
The metallocene compound represented by Chemical Formula 4 may be, for example, a compound represented by any one of the following structural formulae, but is not limited thereto:

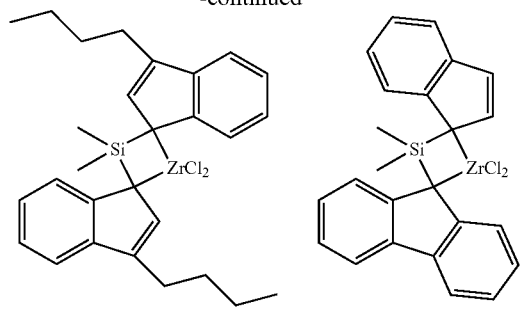
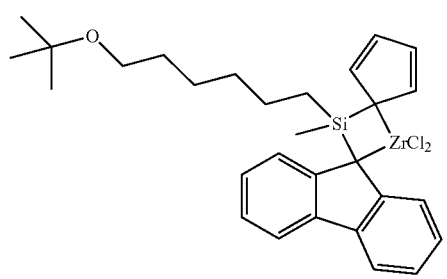
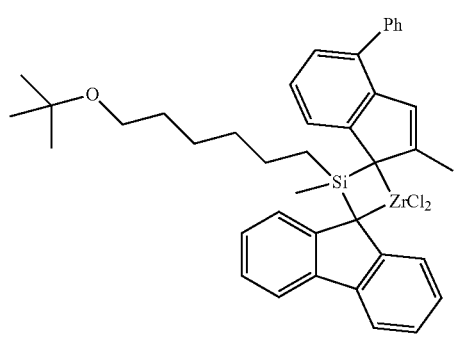
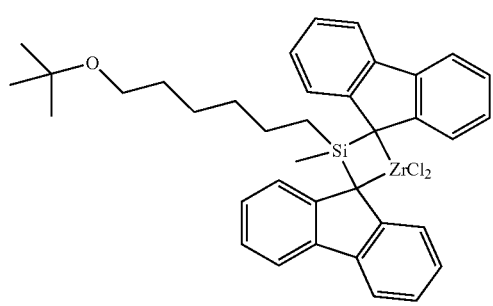
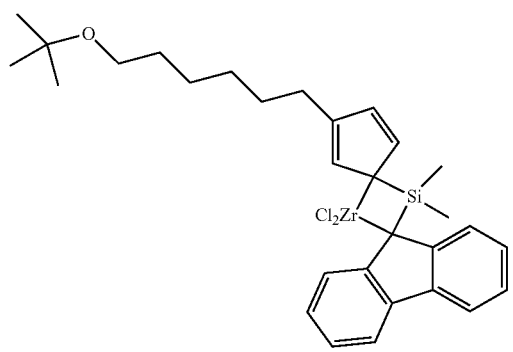
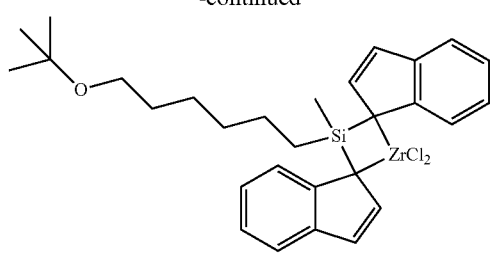
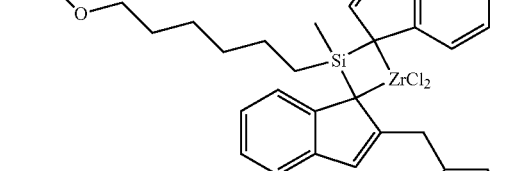
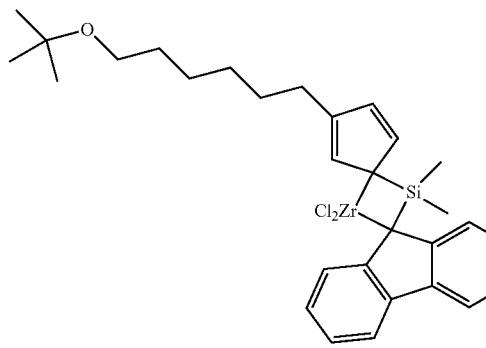
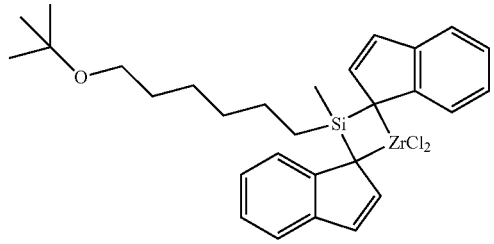
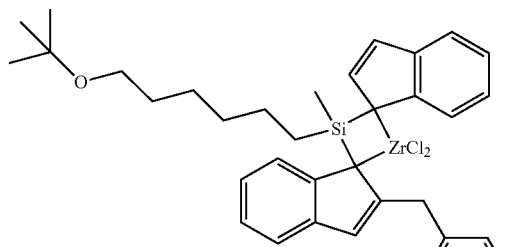
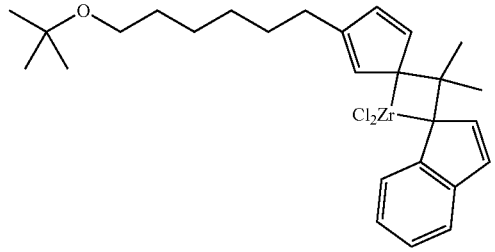

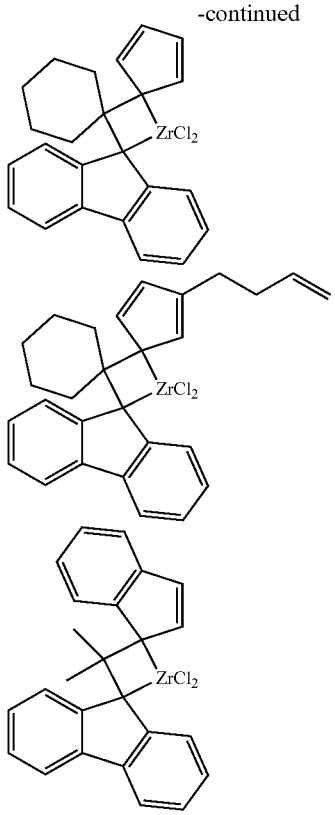
Further, the metallocene compound represented by Chemical Formula 5 may be, for example, a compound represented by any one of the following structural formulae, but is not limited thereto:
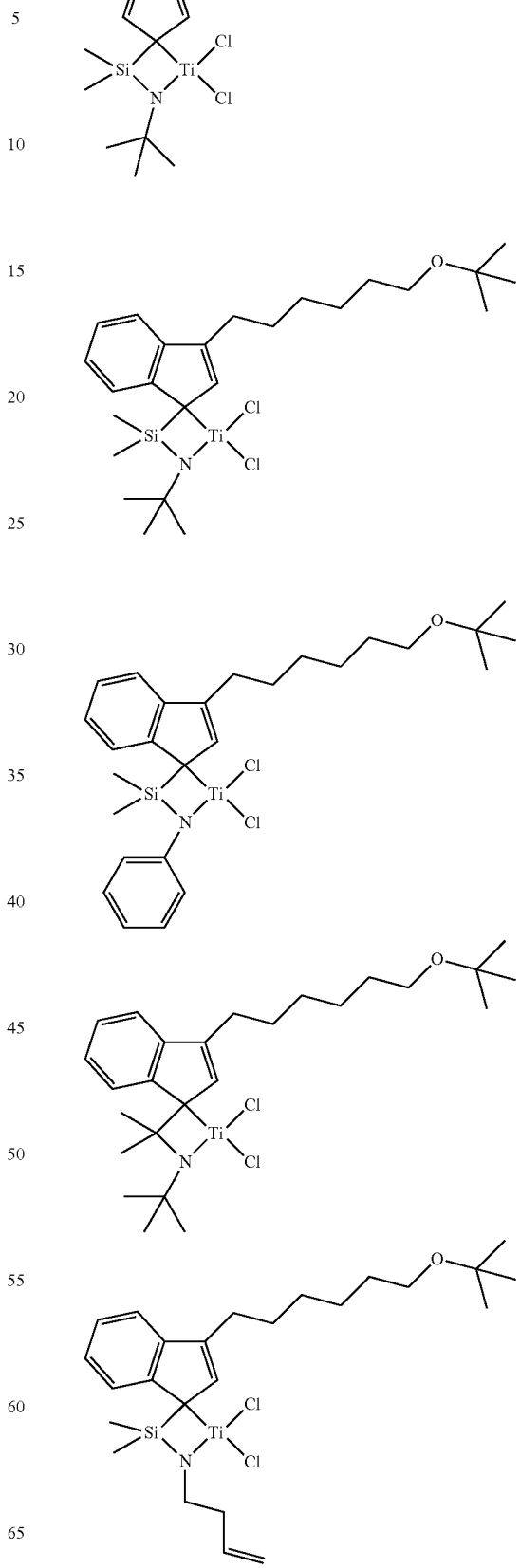

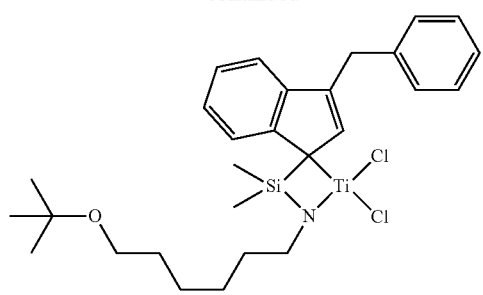
A specific example of the metallocene compound represented by Chemical Formula 6 may be a compound represented by any one of the following structural formulae, but is not limited thereto:
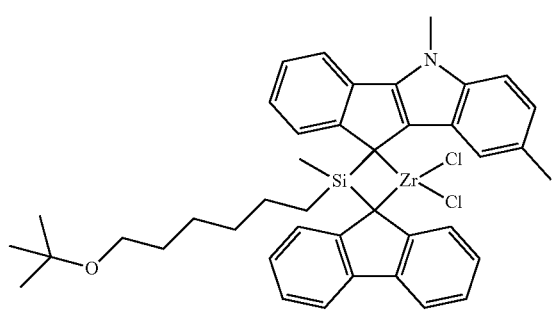
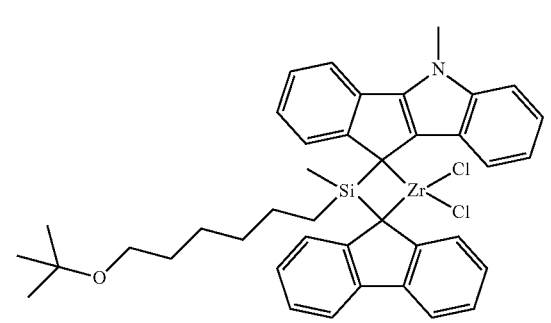
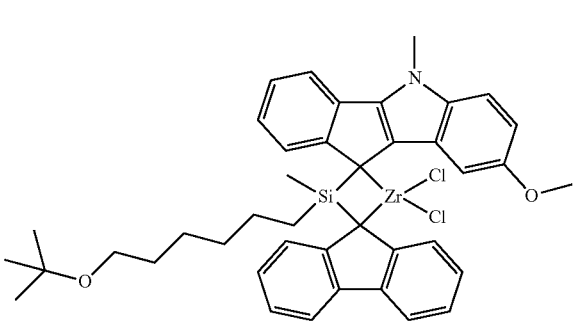
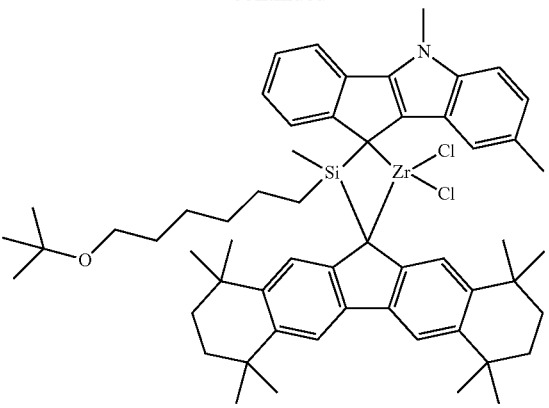
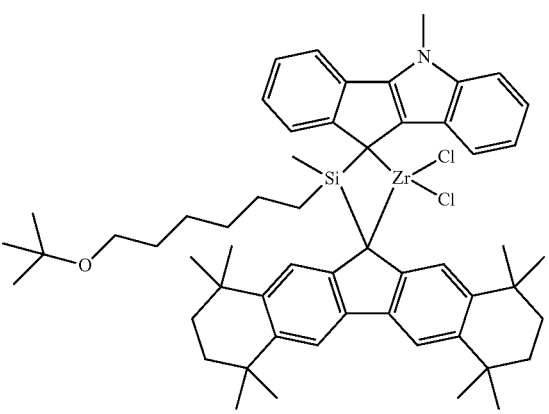
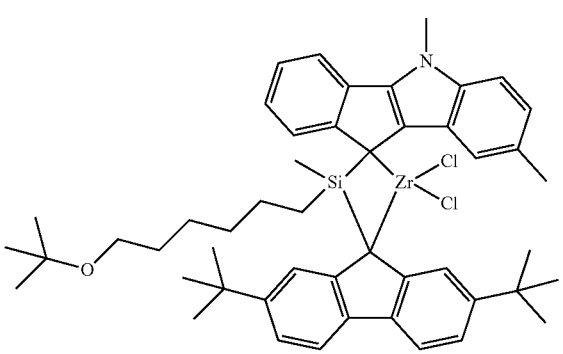
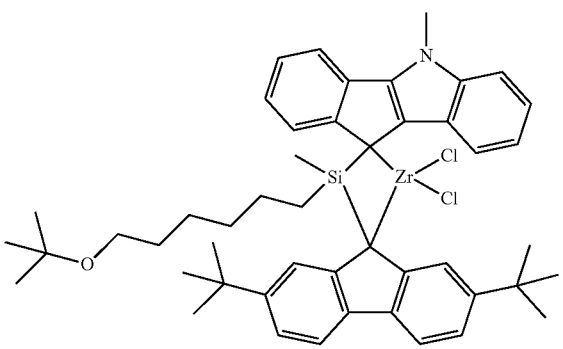

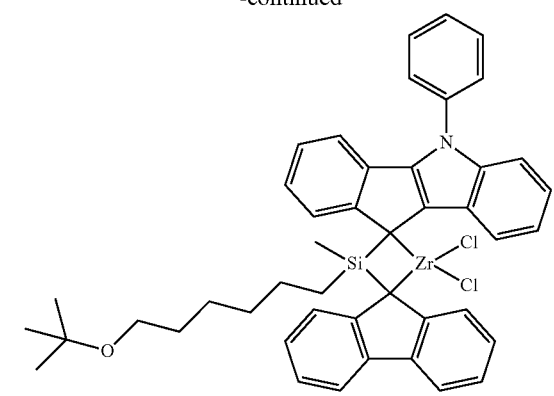
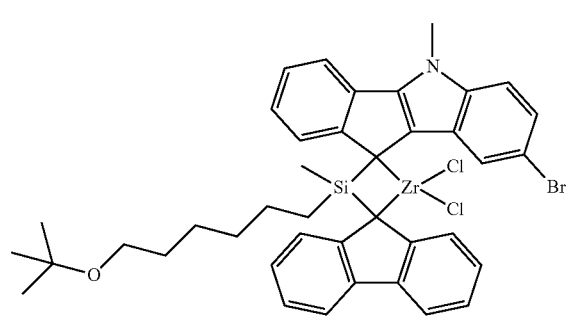
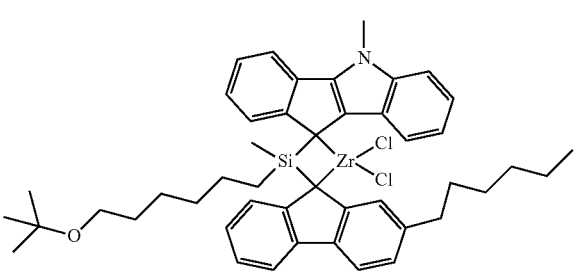
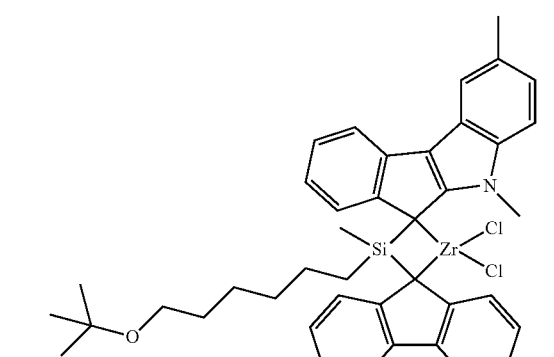
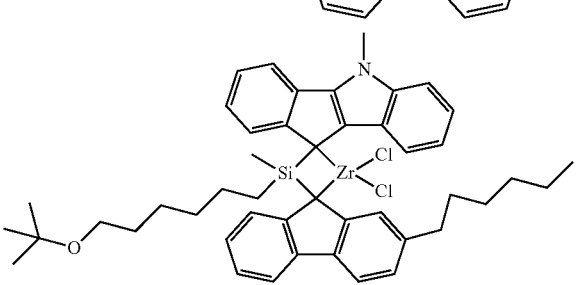
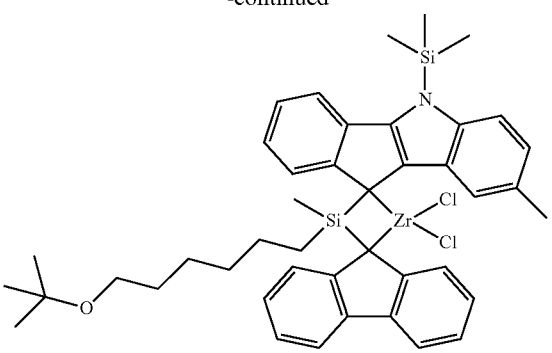
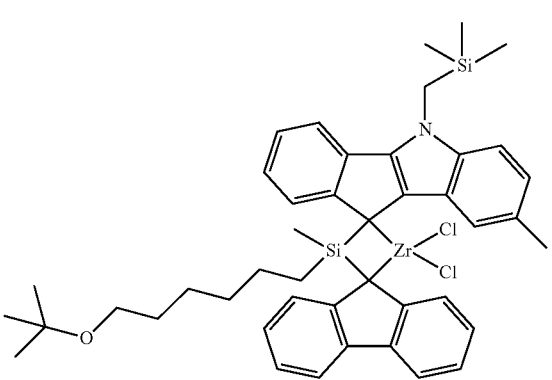
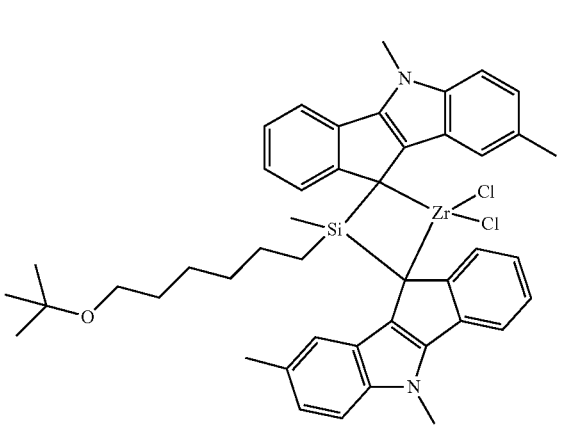
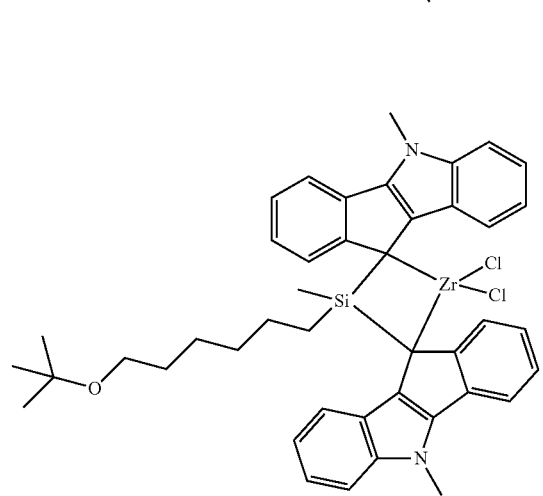

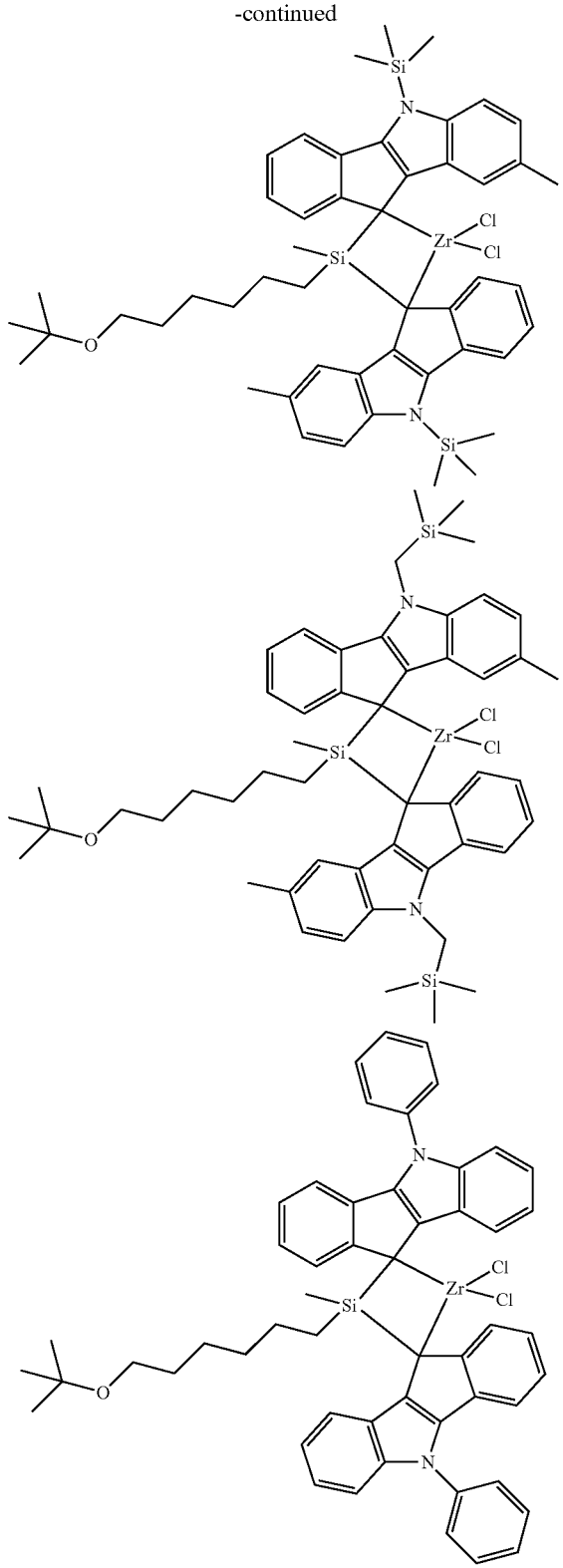

The hybrid supported catalyst system is obtained by supporting one or more kinds of the above-described metallocene compounds and one or more kinds of the organic chromium compounds on a support.

According to an Example of the invention, the hybrid supported catalyst system may further include one or more cocatalysts of an aluminum-containing first cocatalyst of the following Chemical Formula 8 and a borate-based second cocatalyst of the following Chemical Formula 9:

[Al($R_{26}$)—O]$_k$—      [Chemical Formula 8]

wherein $R_{26}$ is the same as or different from each other, and each independently a halogen radical, a hydrocarbyl radical having 1 to 20 carbon atoms, or a hydrocarbyl radical having 1 to 20 carbon atoms, which is substituted with halogen, and k is an integer of 2 or more, $T^+[BG_4]^-$      [Chemical Formula 9]

wherein $T^+$ is a polyatomic ion having a valence of +1, B is boron in +3 oxidation state, and Gs are each independently selected from the group consisting of a hydride group, a dialkylamido group, a halide group, an alkoxide group, an aryloxide group, a hydrocarbyl group, a halocarbyl group, and a halo-substituted hydrocarbyl group, and G has 20 or less carbon atoms, provided that G is a halide group in one or less position.

Due to the use of the first and second cocatalysts, a molecular weight distribution of the finally prepared polyolefin may become more uniform, and polymerization activity may be improved.

The first cocatalyst of Chemical Formula 8 may be an alkyaluminoxane compound including repeat units bonded in a linear, circular, or network shape, and specific examples of the first cocatalyst may include methylaluminoxane (MAO), ethylaluminoxane, isobutylaluminoxane, butylaluminoxane, etc.

Further, the second cocatalyst of Chemical Formula 9 may be a borate-based compound in the form of a tri-substituted ammonium salt, a dialkyl ammonium salt, or a tri-substituted phosphonium salt. Specific examples of the second cocatalyst may include borate-based compounds in the form of tri-substituted ammonium salts, such as trimethylammonium tetraphenylborate, methyldioctadecylammonium tetraphenylborate, triethylammonium tetraphenylborate, tripropylammonium tetraphenylborate, tri(n-butyl) ammonium tetraphenylborate, methyltetradecyclooctadecylammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis (pentafluorophenyl)borate, methylditetradecylammonium tetrakis(pentaphenyl)borate, methyldioctadecylammonium tetrakis(pentafluorophenyl)borate, triethylammonium tetrakis(pentafluorophenyl)borate, tripropylammonium tetrakis (pentafluorophenyl)borate, tri(n-butyl)ammonium tetrakis (pentafluorophenyl)borate, tri(sec-butyl)ammonium tetrakis (pentafluorophenyl)borate, N,N-dimethylanilinium tetrakis (pentafluorophenyl)borate, N,N-diethylanilinium tetrakis (pentafluorophenyl)borate, N,N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl) borate, tripropylammonium tetrakis(2,3,4,6-tetrafluorophenyeborate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, N,N-dimethyl-(2,4,6-trimethylanilinium)tetrakis-(2,3,4,6-tetrafluorophenyl)borate, etc.; borate-based compounds in the form of dialkyl ammonium salts, such as dioctadecylammonium tetrakis(pentafluorophenyl)borate, ditetradecylammonium tetrakis(pentafluorophenyl)borate, dicyclohexylammonium tetrakis(pentafluorophenyl)borate, etc.; or borate-based compounds in the form of tri-substituted phosphonium salts, such as triphenylphosphonium tetrakis(pentafluorophenyl)borate, methyldioctadecylphosphonium tetrakis(pentafluorophenyl)borate, tri(2,6-dimethylphenyl) phosphonium tetrakis(pentafluorophenyl)borate, etc.

In the catalyst composition of the present invention, a molar ratio of the organic chromium compound:the metallocene compound may be about 10:1 to about 1:10, and preferably about 1:5 to about 5:1 based on the transition metal, in order to increase selectivity for linear alpha-olefin and oligomerization and copolymerization activities. However, the present invention is not limited thereto, and the molar ratio may vary depending on a polyolefin to be prepared.

In the hybrid supported catalyst system, a weight ratio of the support to the total transition metal included in the metallocene compound and organic chromium compound may be 1:10 to 1:1,000. When the support is included in the above weight ratio, the optimum shape may be exhibited. Further, a weight ratio of the support to the cocatalyst compound may be 1:1 to 1:100.

In the preparation method of polyolefin, the support may be a support containing hydroxyl groups on the surface thereof. Preferably, a support having highly reactive hydroxyl groups and siloxane groups, of which surface moisture was removed by drying, may be used.

For example, silica, silica-alumina, silica-magnesia, etc. dried at a high temperature may be used, and they may commonly contain oxide, carbonate, sulfate, and nitrate, such as $Na_2O$, $K_2CO_3$, $BaSO_4$, $Mg(NO_3)_2$, etc.

A drying temperature of the support may be preferably about 200° C. to about 800° C., more preferably about 300° C. to about 600° C., and most preferably about 300° C. to about 400° C. If the drying temperature of the support is lower than about 200° C., due to excessive moisture, surface moisture may react with the cocatalyst, and if it is higher than about 800° C., pores on the support surface may combine with each other to reduce the surface area, and a lot of hydroxyl groups may be lost on the surface and only siloxane groups may remain, thereby decreasing the reaction sites with the cocatalyst, which is not preferable.

An amount of the hydroxyl groups on the support surface may be preferably about 0.1 mmol/g to about 10 mmol/g, and more preferably about 0.5 mmol/g to about 1 mmol/g. The amount of the hydroxyl groups on the support surface may be controlled by the preparation method and conditions of the support, or drying conditions, for example, temperature, time, vacuum, spray drying, etc.

If the amount of the hydroxyl groups is less than about 0.1 mmol/g, there are fewer reaction sites with the cocatalyst, and if it is more than about 10 mmol/g, there is a possibility of being attributed to moisture other than hydroxyl groups present on the surface of support particle, which is not preferable.

In the catalyst system including the organic chromium compound, the metallocene compound, and the cocatalyst, the components of the catalyst system may be added simultaneously or sequentially in a random order to a suitable solvent in the absence or presence of monomers, thereby being obtained as an active catalyst. The suitable solvent may include heptane, toluene, cyclohexane, methylcyclohexane, 1-hexene, diethylether, tetrahydrofuran, acetonitrile, dichloromethane, chloroform, chlorobenzene, methanol, acetone, etc., but is not limited thereto.

The hybrid supported catalyst system according to the present invention may be prepared by, for example, the steps of supporting the cocatalyst compound on a support, supporting the metallocene compound on the support, and supporting the organic chromium compound on the support.

In the preparation method of the hybrid supported catalyst, the order of the step of supporting the metallocene compound and the step of supporting the organic chromium compound may be changed, if necessary. That is, the metallocene compound is first supported on the support, and then the organic chromium compound is additionally supported thereon to prepare the hybrid supported catalyst, or the organic chromium compound is first supported on the support, and then the metallocene compound is additionally supported thereon to prepare the hybrid supported catalyst.

Meanwhile, according to still another embodiment of the invention, provided is a method of preparing a polyolefin, including the step of polymerizing olefinic monomers in the presence of the above-described hybrid supported catalyst system.

When the hybrid supported catalyst system of an embodiment is used, a separate process of preparing alpha-olefin or an additional feeding of comonomers is not needed, and oligomerization and copolymerization of olefin monomers may be performed in a single reactor at the same time with high efficiency.

Ethylene may be preferably used as the olefinic monomer.

The polyolefin preparation according to the present invention may be conducted using ethylene as the olefinic monomer in a single continuous slurry polymerization reactor, loop slurry reactor, gas-phase reactor, or solution reactor.

The hybrid supported catalyst system may be injected into the reaction system after being dissolved or diluted in aliphatic hydrocarbon solvents having 5 to 12 carbon atoms, for example, pentane, hexane, heptanes, nonane, decane and isomers thereof, aromatic hydrocarbon solvents such as toluene and benzene, chlorine-substituted hydrocarbon solvents such as dichloromethane and chlorobenzene. It is preferable that the solvent used herein is treated with a small amount of alkyl aluminum, thereby removing a small amount of water, air, etc., which acts as a catalytic poison, and it is possible to further use a cocatalyst.

The step of polymerizing olefinic monomers may be conducted at a temperature of about 5° C. to about 200° C., and preferably, at a temperature of about 30° C. to about 150° C. Further, the step of polymerizing olefinic monomers may be conducted at a pressure of about 1 bar to about 300 bar, and preferably, at a pressure of about 2 bar to about 150 bar.

According to an Example of the present invention, polymerization may be performed by feeding olefinic monomers in the presence of hydrogen gas.

In this regard, the hydrogen gas functions to inhibit a rapid reaction of the metallocene catalyst at the initial stage of polymerization, and enables production of high molecular weight polyolefin in a larger amount. Thus, due to the use of hydrogen gas, polyolefin having a higher molecular weight and a wider molecular weight distribution may be effectively obtained.

The hydrogen gas may be fed such that a molar ratio of hydrogen gas:olefinic monomer becomes about 1:100 to about 1:1,000. If the amount of hydrogen gas used is excessively small, the sufficient catalytic activity is not achieved, and thus it is difficult to prepare a polyolefin having a desired molecular weight and molecular weight distribution. If an excessively large amount of hydrogen gas is fed, the sufficient catalytic activity is not achieved.

When the hybrid supported catalyst system is reacted with olefinic monomers such as ethylene, oligomerization of olefinic monomers and polymerization of olefinic monomers occur due to contact between each of the organic chromium compound and the metallocene compound in the hybrid supported catalyst system and olefinic monomers. In this regard, the method of preparing the polyolefin of the present invention is not limited to sequential occurrence of the oligomerization and polymerization, and the reactions may occur simultaneously, sequentially, randomly according to contact between the metallocene compound or the organic chromium compound included in the hybrid supported catalyst system and olefinic monomers.

Meanwhile, alpha-olefins, such as propylene, 1-butene, 1-octene, 1-hexene, produced by contact between the organic chromium compound and olefinic monomers exist inside the hybrid supported catalyst system or in the vicinity of the hybrid supported catalyst system. Therefore, a probability of contact between the metallocene compound and alpha-olefins which are produced by the organic chromium compound supported in the hybrid supported catalyst system is higher than that in the general olefin copolymerization wherein alpha-olefins are fed into a reactor separately from the catalyst system. Therefore, since the amount of alpha-olefins not incorporated into the polyolefin may be decreased, and a comonomer conversion rate may be increased to increase contents of SCB (short chain branch) and LCB (long chain branch) in the polyolefin, thereby producing high-quality linear low-density polyethylene. Further, since there is no need to separately feed expensive comonomers, costs for preparing or purchasing comonomers may be reduced, thereby reducing the production cost of a final product.

Hereinafter, the present invention will be explained in detail with reference to Examples of the present invention. However, it must be interpreted in such a way that these examples may be modified in various forms and the scope of the invention is not limited thereto.

<Synthesis of Compound>

All reactions were progressed using Schlenk technique or a Glove box under argon atmosphere. The synthesized compounds were analyzed by $^1$H (500 MHz) and $^{31}$P (202 MHz) NMR spectra using a Varian 500 MHz spectrometer. Shift was expressed in ppm, downfield from TMS, with a residual solvent peak as a reference. A phosphorous probe was calibrated with aqueous $H_3PO_4$.

Synthesis Example of Organic Chromium Compound

Synthesis Example 1

1-1> Synthesis of Ligand Compound

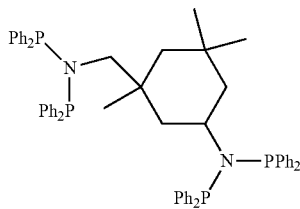

Under argon atmosphere, 3-(aminomethyl)-3,5,5-trimethylcyclohexanamine (5 mmol) and triethylamine (3~10 equiv. to amine) were dissolved in dichloromethane (80 mL). While flak was immersed in a water bath, chlorodiphenylphosphine (20 mmol, 2 equiv. to amine) was slowly introduced, followed by agitation overnight. The solvent was removed under vacuum, and then THF was introduced. This mixture was sufficiently agitated, and a triethylammonium chloride salt was removed with an air-free glass filter. The solvent was removed from the filtrate to obtain a product.

$^{31}$P NMR (202 MHz, CDCl$_3$): 45.6 (br s), 56.2 (br s)

1-2> Synthesis of Organic Chromium Compound

Under argon gas, 0.3 mmol of chromium(III) acetylacetonate(Cr(acac)$_3$) and 0.15 mmol of the ligand compound prepared in the Synthesis Example 1-1 were put in a flask. 100 mL of dichloromethane (CH$_2$Cl$_2$) was added thereto, followed by agitation for 1 hour or longer. The dichloromethane was removed under reduced pressure, and 65 mL of toluene was added to prepare an organic chromium compound solution.

Synthesis Example 2

An organic chromium compound solution was prepared in the same manner as in Synthesis Example 1, except that 0.124 mmol of chromium(III) acetylacetonate(Cr(acac)$_3$) and 0.062 mmol of the ligand compound were used in Synthesis Example 1.

Synthesis Example of Metallocene Compound

Synthesis Example 3: (tBu-O—(CH$_2$)$_6$—O$_5$H$_4$)$_2$ZrCl$_2$ t-Butyl-O—(CH$_2$)$_6$—Cl was prepared using 6-chlorohexanol according to a method suggested in a literature (Tetrahedron Lett. 2951 (1988)), and reacted with NaCp to prepare t-Butyl-O—(CH$_2$)$_6$—O$_5$H$_5$ (yield 60%, b.p. 80° C./0.1 mmHg).

Further, t-Butyl-O—(CH$_2$)$_6$—O$_5$H$_5$ was dissolved in THF at −78° C., and normal butyl lithium (n-BuLi) was slowly added thereto. The temperature was raised to room temperature, and the mixture was allowed to react for 8 hours. A solution of the synthesized lithium salt was slowly added to a suspension solution of ZrCl$_4$(THF)$_2$ (1.70 g, 4.50 mmol)/THF (30 mL), and allowed to react at room temperature for 6 hours.

All the volatile materials were removed under vacuum, and a hexane solvent was added to the obtained oily liquid material, followed by filtration. The filtered solution was dried under vacuum, and hexane was added thereto to induce precipitation at low temperature (−20° C.). The resultant precipitate was filtered at low temperature to obtain a [tBu-O—(CH$_2$)$_6$—O$_5$H$_4$]$_2$ZrCl$_2$ compound as a white solid (yield 92%).

$^1$H NMR (300 MHz, CDCl$_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

$^{13}$C NMR (CDCl$_3$): 135.09, 116.66, 112.28, 72.42, 61.52, 30.66, 30.61, 30.14, 29.18, 27.58, 26.00.

Synthesis Example 4: (tBu-O—(CH$_2$)$_6$)(CH$_3$)Si(C$_5$(CH$_3$)$_4$)(tBu-N)TiCl$_2$ 50 g of Mg(s) was added to a 10 L reactor at room temperature, and 300 mL of THF was added thereto. About 0.5 g of I$_2$ was added thereto, and the reactor temperature was maintained at 50° C. After the reactor temperature was stabilized, 250 g of 6-t-buthoxyhexyl chloride was added to the reactor at a speed of 5 mL/min by using a feeding pump.

According to the addition of 6-t-buthoxyhexyl chloride, it was observed that the reactor temperature was increased by about 4° C. to 5° C. While 6-t-buthoxyhexyl chloride was continuously added, agitation was performed for 12 hours. A black reaction solution was obtained after reaction for 12 hours. After 2 mL of the produced black solution was sampled, water was added thereto to obtain an organic layer. Thus, 6-t-buthoxyhexane was confirmed by 1H-NMR. 6-t-buthoxyhexane indicated that the Grignard reaction was well performed. Accordingly, 6-t-buthoxyhexyl magnesium chloride was synthesized.

After 500 g of $MeSiCl_3$ and 1 L of THF were added to the reactor, the reactor temperature was cooled to −20° C. 560 g of the synthesized 6-t-buthoxyhexyl magnesium chloride was added to the reactor by using a feeding pump at a speed of 5 mL/min After feeding of the Grignard reagent was finished, the reactor temperature was slowly increased to room temperature and agitation was performed for 12 hours. After reaction for 12 hours, it was confirmed that the white $MgCl_2$ salt was generated. 4 L of hexane was added and the salt was removed through labdori to obtain a filter solution. After the resulting filter solution was added to the reactor, hexane was removed at 70° C. to obtain a light yellow liquid. It was confirmed by 1H-NMR that the obtained liquid was a desired methyl(6-t-buthoxy hexyl)dichlorosilane} compound.

$^1$H-NMR ($CDCl_3$): 3.3 (t, 2H), 1.5 (m, 3H), 1.3 (m, 5H), 1.2 (s, 9H), 1.1 (m, 2H), 0.7 (s, 3H)

After 1.2 mol (150 g) of tetramethylcyclopentadiene and 2.4 L of THF were added to the reactor, the reactor temperature was cooled to −20° C. 480 mL of n-BuLi was added to the reactor by using the feeding pump at a speed of 5 mL/min After n-BuLi was added, the reactor temperature was slowly increased to room temperature and agitation was performed for 12 hours. After reaction for 12 hours, an equivalent of methyl(6-t-buthoxy hexyl)dichlorosilane (326 g, 350 mL) was rapidly added to the reactor. The reactor temperature was slowly increased to room temperature and agitation was performed for 12 hours. Then, the reactor temperature was cooled to 0° C., and 2 equivalents of t-$BuNH_2$ was added. The reactor temperature was slowly increased to room temperature and agitation was performed for 12 hours. After reaction for 12 hours, THF was removed, and 4 L of hexane was added to obtain a filter solution, from which the salt was removed by using the labdori. After the filter solution was added to the reactor, hexane was removed at 70° C. to obtain a yellow solution. It was confirmed by 1H-NMR that the obtained yellow solution was a methyl(6-t-buthoxyhexyl)(tetramethylCpH)t-butylaminosilane compound.

$TiCl_3(THF)_3$ (10 mmol) was rapidly added to n-BuLi and the dilithium salt of the ligand at −78° C., which was synthesized from the ligand dimethyl(tetramethylCpH)t-butylaminosilane in the THF solution. The reaction solution was agitated for 12 hours while the temperature was slowly increased from −78° C. to room temperature. After agitation was performed for 12 hours, an equivalent of $PbCl_2$ (10 mmol) was added to the reaction solution at room temperature and agitation was performed for 12 hours. After agitation was performed for 12 hours, a dark black solution having the blue color was obtained. After THF was removed from the resulting reaction solution, hexane was added to filter the product. After hexane was removed from the filter solution, it was confirmed by 1H-NMR that the solution was (tBu-O—$(CH_2)_6$)($CH_3$)Si($C_5(CH_3)_4$)(tBu-N)$TiCl_2$ which is a desired [methyl(6-t-buthoxyhexyl)silyl(η5-tetramethylCp)(t-Butylamido)]$TiCl_2$.

1H-NMR ($CDCl_3$): 3.3 (s, 4H), 2.2 (s, 6H), 2.1 (s, 6H), 1.8~0.8 (m), 1.4 (s, 9H), 1.2 (s, 9H), 0.7 (s, 3H)

Preparation Example of Hybrid Supported Catalyst

Preparation Example 1

100 mL of toluene was added to a glass reactor at room temperature, and 10 g of dried silica was introduced thereto. Then, the reactor temperature was raised to 40° C., followed by agitation. After silica was sufficiently dispersed, 91 mL of 10 wt % methylaluminoxane (MAO)/toluene solution was introduced, and the temperature was raised to 80° C., followed by agitation at 200 rpm for 12 hours. Thereafter, the temperature was decreased to 40° C., and unreacted aluminum compound was removed by washing with a sufficient amount of toluene. 100 mL of toluene was introduced, and then 0.1 mmol of the metallocene compound prepared in Synthesis Example 4 was introduced, followed by agitation for 1 hour. Secondly, 0.1 mmol of the metallocene compound prepared in Synthesis Example 3 was introduced, and then reaction was further allowed for 1 hour. Lastly, the organic chromium compound solution prepared in Synthesis Example 1 was introduced, and then reaction was further allowed for 2 hour.

After the reaction was finished, agitation was stopped, and a toluene layer was separated and removed, and then toluene was removed under reduced pressure at 40° C. to prepare a hybrid supported catalyst.

Preparation Example 2

A hybrid supported catalyst was prepared in the same manner as in Preparation Example 1, except that the organic chromium compound solution prepared in Synthesis Example 2 was used in Preparation Example 1.

Comparative Preparation Example 1

A metallocene supported catalyst was prepared in the same manner as in Preparation Example 1, except that no organic chromium compound solution was used in Preparation Example 1.

Example of Polyolefin Polymerization

Example 1

10 mg of the hybrid supported catalyst prepared in Preparation Example 1 was weighed in a dry box and put in a 50 mL glass bottle. The bottle was sealed with a rubber diaphragm and taken out of the dry box, and a catalyst to be injected was prepared. Polymerization was performed in a 600 mL temperature-controllable metal alloy reactor for high pressure, equipped with a mechanical stirrer.

To this reactor, 400 mL of hexane containing 1.0 mmol of triethylaluminum and the prepared hybrid supported catalyst were introduced without contact with air. Polymerization was carried out for 1 hour at 80° C., while continuously applying a gaseous ethylene monomer at a pressure of 30 $Kgf/cm^2$. The polymerization was terminated by stopping agitation, and then by exhausting ethylene.

The resulting polymer was dried in a vacuum oven at 80° C. for 4 hours, after removing the polymerization solvent by filtration.

Example 2

Polyolefin polymerization was performed in the same manner as in Example 1, except that the hybrid supported catalyst of Preparation Example 2 was used in Example 1.

Example 3

Polyolefin polymerization was performed in the same manner as in Example 1, except that the hybrid supported catalyst of Preparation Example 2 was used and polymerization was performed at 85° C. in Example 1.

Example 4

Polyolefin polymerization was performed in the same manner as in Example 1, except that the hybrid supported catalyst of Preparation Example 2 was used and 0.03% of hydrogen relative to ethylene was introduced in Example 1.

Comparative Example 1

Polyolefin polymerization was performed in the same manner as in Example 1, except that the hybrid supported catalyst of Comparative Preparation Example 1 was used in Example 1.

Comparative Example 2

Polyolefin polymerization was performed in the same manner as in Example 1, except that the hybrid supported catalyst of Comparative Preparation Example 1 was used and 13.5 g of 1-hexene was additionally introduced in Example 1.

The supported catalysts used in Examples and Comparative Examples, polymerization conditions, polymerization activity, and molecular weights and molecular weight distributions of the resulting polymers are shown in the following Table 1.

Referring to Table 1, in Comparative Example 1, only ethylene was copolymerized without comonomers by using only the metallocene compound-supported catalyst, and as a result, no copolymer chains were found.

In Comparative Example 2, polymerization was performed by using only the metallocene compound-supported catalyst and introducing 1-hexene as a comonomer, and as a result, it was confirmed that a polyolefin copolymerized with 1-hexene was produced. Meanwhile, in Comparative Example 2, 13.5 g of 1-hexene was introduced, but about 13.0 g of 1-hexene was found in a solution remaining after synthesis, indicating that a significant amount of 1-hexene was not incorporated during copolymerization and remained.

In contrast, in Examples 1 to 4, copolymerization was performed with only ethylene by using the hybrid catalyst in which the organic chromium compound and the metallocene compound were supported, and as a result, it was confirmed that alpha-olefins were copolymerized at the terminal of polyolefin at a molar ratio higher than that of Comparative Example 2, although comonomers were not used. Therefore, it can be seen that ethylene was oligomerized by the hybrid supported catalyst to produce alpha-olefin comonomers such as 1-hexene, and the produced comonomers were successfully incorporated during copolymerization.

Additionally, presence of 1-hexene and 1-octene in solutions remaining after synthesis in Examples 1 to 4 was confirmed by GC analysis, and various comonomers such as 1-octene as well as 1-hexene were found. Particularly, in all Examples, the amount of alpha-olefins incorporated into the polyolefin was higher than that of Comparative Example 2, but the amount of alpha-olefins remaining after polymerization was smaller than that of Comparative Example 2, suggesting that the similar level of comonomer incorporation occurred even at a low concentration of comonomers in the reaction system. Accordingly, it can be seen that the catalyst system of the present invention exhibits a high comonomer incorporation rate.

TABLE 1

| | Supported catalyst | Injection amount of 1-hexene (g) | Activity (kgPE/gSiO$_2$) | Physical properties of polyolefin | | | Alpha-olefin remaining after polymerization | |
|---|---|---|---|---|---|---|---|---|
| | | | | Content of alpha olefin (mol %) | Tm (° C.) | Mw (*10$^3$ mol/g) | 1-Hx (g) | 1-Oc (g) |
| Example 1 | Preparation Example 1 | 0 | 4.4 | 0.65 | 130 | 423 | 2.9 | 1.1 |
| Example 2 | Preparation Example 2 | 0 | 7.6 | 0.49 | 131 | 365 | 1.9 | 0.9 |
| Example 3 | Preparation Example 2 | 0 | 8.5 | 0.49 | 129 | 320 | 1.6 | 0.7 |
| Example 4 | Preparation Example 2 | 0 | 11.5 | 1.09 | 128 | 110 | 2.3 | 1.1 |
| Comparative Example 1 | Comparative Preparation Example 1 | 0 | 13.1 | 0 | 135 | 460 | 0 | 0 |
| Comparative Example 2 | Comparative Preparation Example 1 | 13.5 | 7.4 | 0.46 | 129 | 368 | 13.0 | 0 |

In Table 1, a content of alpha-olefins in the polyolefin was confirmed by normalizing an integral value of the main chain in 1H NMR spectrum to 1000, and then calculating a molar ratio of branches of each sample. In more detail, when an analytical value of a different terminal structure is obtained from the copolymerized polyolefin, the remainder excluding terminal structures having double bonds (that is, alpha-olefins which did not participate in the copolymerization) was assumed as the copolymerized polyolefin, and the main chain was taken as 1000 to calculate a relative terminal ratio. In this regard, it was assumed that the terminal structures having double bonds have the same molecular weight and are produced at the same molar ratio.

What is claimed is:
1. A hybrid supported catalyst system comprising;
one or more organic chromium compounds and one or more metallocene compounds supported on a support,
wherein the organic chromium compound includes two or more of a group represented by the following Chemical Formula 1 in a molecule, phosphorous atoms (P) in one or more of the group represented by Chemical Formula 1 form a coordinate bond with chromium (Cr), and a linkage group (L) linking the two or more groups represented by the following Chemical Formula 1 via 4 to 8 carbon atoms is an aliphatic group having 2 to 20 carbon atoms, a heteroaliphatic group having 2 to 20 carbon atoms, an alicyclic group having 2 to 20 carbon atoms, a heteroalicyclic group having 2 to 20 carbon atoms, or a group prepared by linking two or more of the aliphatic group, the heteroaliphatic group, the alicyclic group, and the heteroalicyclic group:

[Chemical Formula 1]

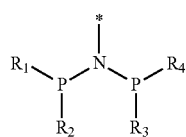

wherein * is a part which binds to the linkage group (L) linking the two or more groups, and $R_1$ to $R_4$ are each independently an alkyl group having 1 to 20 carbon atoms, an alkenyl group having 2 to 20 carbon atoms, an aryl group having 6 to 20 carbon atoms, an arylalkyl group having 7 to 20 carbon atoms, an alkylaryl group having 7 to 20 carbon atoms, or an alkoxyaryl group having 7 to 20 carbon atoms.

2. The hybrid supported catalyst system of claim 1, wherein the linkage group (L) is a group selected from the group consisting of the following Chemical Formulae:

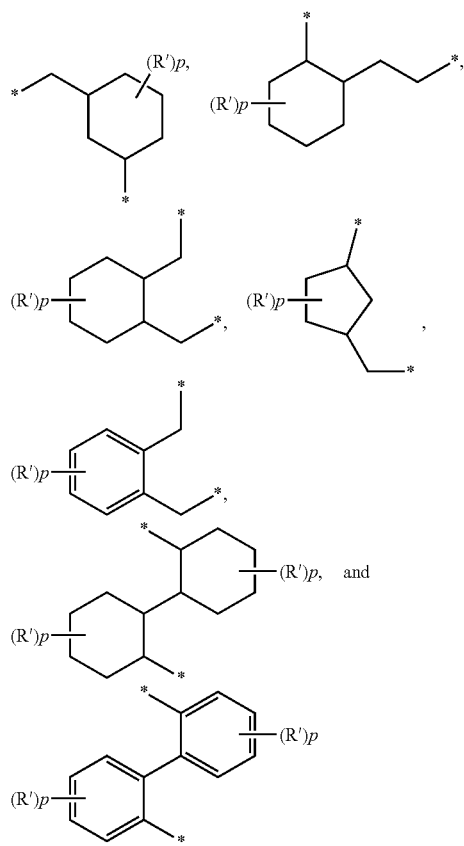

wherein * is a part which binds to N of Chemical Formula 1,

R's are each independently hydrogen or alkyl having 1 to 5 carbon atoms, p is an integer of 1 to 6, q is an integer of 1 to 5, and a plurality of R's binding to one ring are the same as or different from each other.

3. The hybrid supported catalyst system of claim 1, wherein the organic chromium compound is represented by the following Chemical Formula 1-1:

[Chemical Formula 1-1]

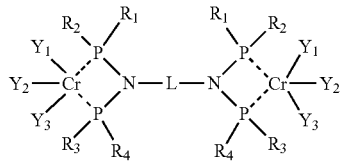

wherein L is a linkage group linking nitrogen (N) atoms via 4 to 8 carbon atoms, and is an aliphatic group having 2 to 20 carbon atoms, a heteroaliphatic group having 2 to 20 carbon atoms, an alicyclic group having 2 to 20 carbon atoms, a heteroalicyclic group having 2 to 20 carbon atoms, or a group prepared by linking two or more of the aliphatic group, the heteroaliphatic group, the alicyclic group, and the heteroalicyclic group, $R_1$ to $R_4$ are each independently an alkyl group having 1 to 20 carbon atoms, an alkenyl group having 2 to 20 carbon atoms, an aryl group having 6 to 20 carbon atoms, an arylalkyl group having 7 to 20 carbon atoms, an alkylaryl group having 7 to 20 carbon atoms, or an alkoxyaryl group having 7 to 20 carbon atoms; and $Y_1$ to $Y_3$ are each independently halogen, hydrogen, a hydrocarbyl group having 1 to 10 carbon atoms, or a heterohydrocarbyl group having 1 to 10 carbon atoms.

4. The hybrid supported catalyst system of claim 1, wherein the organic chromium compound is represented by the following Chemical Formula 1-2:

[Chemical Formula 1-2]

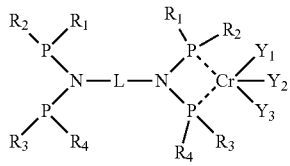

wherein L is a linkage group linking nitrogen (N) atoms via 4 to 8 carbon atoms, and is an aliphatic group having 2 to 20 carbon atoms, a heteroaliphatic group having 2 to 20 carbon atoms, an alicyclic group having 2 to 20 carbon atoms, a heteroalicyclic group having 2 to 20 carbon atoms, or a group prepared by linking two or more of the aliphatic group, the heteroaliphatic group, the alicyclic group, and the heteroalicyclic group, $R_1$ to $R_4$ are each independently an alkyl group having 1 to 20 carbon atoms, an alkenyl group having 2 to 20 carbon atoms, an aryl group having 6 to 20 carbon atoms, an arylalkyl group having 7 to 20 carbon atoms, an alkylaryl group having 7 to 20 carbon atoms, or an alkoxyaryl group having 7 to 20 carbon atoms; and $Y_1$ to $Y_3$ are each independently halogen, hydrogen, a hydrocarbyl group having 1 to 10 carbon atoms, or a heterohydrocarbyl group having 1 to 10 carbon atoms.

5. The hybrid supported catalyst system of claim 1, wherein $R_1$ to $R_4$ of Chemical Formula 1 is phenyl.

6. The hybrid supported catalyst system of claim 1, wherein the metallocene compound includes one or more selected from compounds represented by the following Chemical Formulae 3 to 6:

$$(Cp^1R^a)_n(Cp^2R^b)M^1Z^1_{3-n}$$ [Chemical Formula 3]

wherein $M^1$ is a Group 4 transition metal;

$Cp^1$ and $Cp^1$ are the same as or different from each other, and each independently any one selected from the group consisting of cyclopentadienyl, indenyl, 4,5,6,7-tetrahydro-1-indenyl, and fluorenyl radicals, which may be substituted with hydrocarbon having 1 to 20 carbon atoms;

$R^a$ and $R^b$ are the same as or different from each other, and each independently hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^1$ is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, a substituted or unsubstituted amino group, C2 to C20 alkylalkoxy, or C7 to C40 arylalkoxy;

n is 1 or 0;

$$(Cp^3R^c)_mB^1(Cp^4R^d)M^2Z^2_{3-m}$$ [Chemical Formula 4]

wherein $M^2$ is a Group 4 transition metal;

$Cp^3$ and $Cp^4$ are the same as or different from each other, and each independently any one selected from the group consisting of cyclopentadienyl, indenyl, 4,5,6,7-tetrahydro-1-indenyl, and fluorenyl radicals, which may be substituted with hydrocarbon having 1 to 20 carbon atoms;

$R^c$ and $R^d$ are the same as or different from each other, and each independently hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^2$ is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, a substituted or unsubstituted amino group, C2 to C20 alkylalkoxy, or C7 to C40 arylalkoxy;

$B^1$ is one or more of carbon, germanium, silicon, phosphorus, or nitrogen-containing radical, or a combination thereof, which crosslinks a $Cp^3R^c$ ring with a $Cp^4R^d$ ring, or crosslinks one $Cp^4R^d$ ring to $M^2$;

m is 1 or 0;

$$(Cp^5R^e)B^2(J)M^3Z^3_2$$ [Chemical Formula 5]

wherein $M^3$ is a Group 4 transition metal;

$Cp^5$ is any one selected from the group consisting of cyclopentadienyl, indenyl, 4,5,6,7-tetrahydro-1-indenyl, and fluorenyl radicals, which may be substituted with hydrocarbon having 1 to 20 carbon atoms;

$R^e$ is hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

$Z^3$ is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, a substituted or unsubstituted amino group, C2 to C20 alkylalkoxy, or C7 to C40 arylalkoxy;

$B^2$ is one or more of carbon, germanium, silicon, phosphorus, or nitrogen-containing radical, or a combination thereof, which crosslinks a $Cp^5R^e$ ring with J; and J is any one selected from the group consisting of $NR^f$, O, $PR^f$ and S, wherein $R^f$ is C1 to C20 alkyl, aryl, substituted alkyl, or substituted aryl;

[Chemical Formula 6]

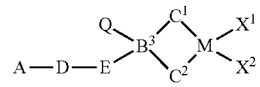

wherein A is hydrogen, halogen, a C1 to C20 alkyl group, a C2 to C20 alkenyl group, a C6 to C20 aryl group, a C7 to C20 alkylaryl group, a C7 to C20 arylalkyl group, a C1 to C20 alkoxy group, a C2 to C20 alkoxyalkyl group, a C3 to C20 heterocycloalkyl group, or a C5 to C20 heteroaryl group;

D is —O—, —S—, —N(R)— or —Si(R)(R')—, wherein R and R' are the same as or different from each other, and each independently hydrogen, halogen, a C1 to C20 alkyl group, a C2 to C20 alkenyl group, or a C6 to C20 aryl group;

E is a C1 to C10 linear or branched alkylene group;

$B^3$ is carbon, silicon, or germanium;

Q is hydrogen, halogen, a C1 to C20 alkyl group, a C2 to C20 alkenyl group, a C6 to C20 aryl group, a C7 to C20 alkylaryl group, or a C7 to C20 arylalkyl group;

M is a Group 4 transition metal;

$X^1$ and $X^2$ are the same as or different from each other, and each independently halogen, a C1 to C20 alkyl group, a C2 to C20 alkenyl group, a C6 to C20 aryl group, a nitro group, an amido group, a C1 to C20 alkylsilyl group, a C1 to C20 alkoxy group, or a C1 to C20 sulfonate group;

$C^1$ and $C^2$ are the same as or different from each other, and each independently represented by any one of the following Chemical Formula 7a, Chemical Formula 7b, or Chemical Formula 7c, provided that both $C^1$ and $C^2$ are not Chemical Formula 7c;

[Chemical Formula 7a]

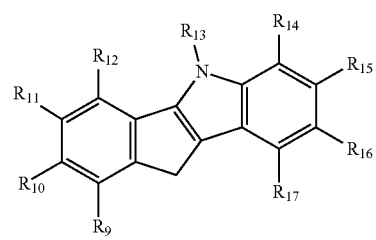

-continued

[Chemical Formula 7b]

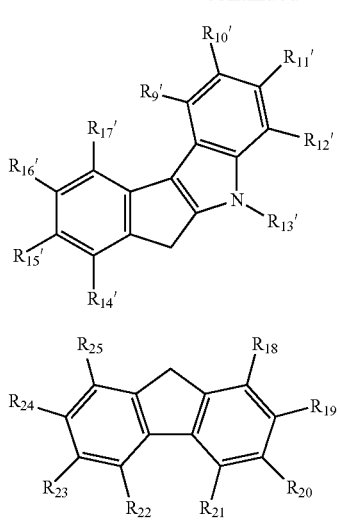

[Chemical Formula 7c]

wherein R9 to R25 and R9' to R17' are the same as or different from each other, and each independently hydrogen, halogen, a C1 to C20 alkyl group, a C2 to C20 alkenyl group, a C1 to C20 alkylsilyl group, a C1 to C20 silylalkyl group, a C1 to C20 alkoxysilyl group, a C1 to C20 alkoxy group, a C6 to C20 aryl group, a C7 to C20 alkylaryl group, or a C7 to C20 arylakyl group, and two or more neighboring groups of R18 to R25 may be connected to each other to form a substituted or unsubstituted aliphatic or aromatic ring.

7. The hybrid supported catalyst system of claim 1, further comprising one or more cocatalysts of an aluminum-containing first cocatalyst of the following Chemical Formula 8 and a borate-based second cocatalyst of the following Chemical Formula 9:

—[Al(R$_{26}$)—O]$_k$—      [Chemical Formula 8]

wherein R$_{26}$ is the same as or different from each other, and each independently a halogen radical, a hydrocarbyl radical having 1 to 20 carbon atoms, or a hydrocarbyl radical having 1 to 20 carbon atoms, which is substituted with halogen, and k is an integer of 2 or more, T$^+$[BG$_4$]$^-$      [Chemical Formula 9]

wherein T$^+$ is a polyatomic ion having a valence of +1, B is boron in +3 oxidation state, and Gs are each independently selected from the group consisting of a hydride group, a dialkylamido group, a halide group, an alkoxide group, an aryloxide group, a hydrocarbyl group, a halocarbyl group, and a halo-substituted hydrocarbyl group, and G has 20 or less carbon atoms, provided that G is a halide group in one or less position.

8. The hybrid supported catalyst system of claim 1, wherein the support is selected from the group consisting of silica, silica-alumina, and silica-magnesia.

9. A method of preparing a polyolefin, comprising the step of polymerizing olefinic monomers in the presence of the hybrid supported catalyst system of claim 1.

10. The method of claim 9, wherein the olefinic monomer is ethylene.

11. The method of claim 9, wherein the step of polymerizing the olefinic monomers includes the step of obtaining ethylene oligomers by oligomerization of the olefinic monomers; and the step of obtaining the polyolefin by polymerization of the ethylene oligomers produced by the oligomerization and the olefinic monomers.

12. The method of claim 11, wherein the step of obtaining the ethylene oligomers and the step of obtaining the polyolefin are performed in the same reactor sequentially or simultaneously.

13. The method of claim 9, wherein the step of polymerizing olefinic monomers is performed at a temperature of 5° C. to 200° C.

14. The method of claim 9, wherein the step of polymerizing olefinic monomers is performed at a pressure of 1 bar to 300 bar.

* * * * *

UNITED STATES PATENT AND TRADEMARK OFFICE
CERTIFICATE OF CORRECTION

PATENT NO. : 10,189,920 B2
APPLICATION NO. : 15/552136
DATED : January 29, 2019
INVENTOR(S) : Seung Mi Le Page 1 of 1

It is certified that error appears in the above-identified patent and that said Letters Patent is hereby corrected as shown below:

On the Title Page

Item [30], insert:
--May 15, 2015 (KR)..........................10-2015-0068299
May 15, 2015 (KR)...........................10-2015-0068300
Jan. 26, 2016 (KR)...........................10-2016-0009561--

Signed and Sealed this
Thirtieth Day of April, 2019

Andrei Iancu
*Director of the United States Patent and Trademark Office*